(12) United States Patent
Small

(10) Patent No.: US 7,495,614 B2
(45) Date of Patent: Feb. 24, 2009

(54) SYSTEM AND METHOD FOR MULTIPATH MITIGATION USING CLUSTERED POSITIONING SIGNALS

(76) Inventor: David Small, c/- Locata Corporation, 401 Clunies Ross St, Action (AU) 2601

( * ) Notice: Subject to any disclaimer, the term of this patent is extended or adjusted under 35 U.S.C. 154(b) by 0 days.

(21) Appl. No.: 10/549,845

(22) PCT Filed: Mar. 30, 2004

(86) PCT No.: PCT/AU2004/000419

§ 371 (c)(1),
(2), (4) Date: Sep. 13, 2005

(87) PCT Pub. No.: WO2004/088349

PCT Pub. Date: Oct. 14, 2004

(65) Prior Publication Data

US 2006/0232467 A1    Oct. 19, 2006

(30) Foreign Application Priority Data

Mar. 31, 2003  (AU)  ............................ 2003901463

(51) Int. Cl.
*G01S 3/02*       (2006.01)

(52) U.S. Cl. ..................... 342/458; 342/463; 342/464; 342/465

(58) Field of Classification Search ................. 342/458, 342/463–465
See application file for complete search history.

(56) References Cited

U.S. PATENT DOCUMENTS 6,177,907 B1 * 1/2001 Golovin et al. .............. 342/458

\* cited by examiner

*Primary Examiner*—Thomas H. Tarcza
*Assistant Examiner*—Fred H. Mull
(74) *Attorney, Agent, or Firm*—Wiley Rein LLP; Scott A. Felder

(57) ABSTRACT

A diversity system for positioning systems is disclosed, whereby a plurality of positioning signals, which are transmitted and/or are received from substantially the same location, are received and interpreted by an observing receiver. The observing receiver is configured to compare and then select substantially coherent positioning signals, and/or create a best-fit estimate of the measured positioning signals, such that accurate position measurements can be determined in multipath-affected environments.

29 Claims, 8 Drawing Sheets

SYSTEM AND METHOD FOR MULTIPATH MITIGATION USING CLUSTERED POSITIONING SIGNALS

FIELD OF THE INVENTION

The present invention relates generally to systems and methods for generating precise position determinations in radio frequency reflective environments. In particular, the present invention applies to position determination systems which receive and interpret positioning signals from substantially the same location to mitigate the deleterious effects of multipath. The present invention has particular, but not exclusive application in positioning technologies where precise range information free from multipath perturbations is essential for accurate positioning.

BACKGROUND OF THE INVENTION

Multipath is an ever-present problem for all RF communications and positioning systems. It causes degraded signal strengths and low data bandwidths for communication systems, and inaccurate range measurements for positioning systems. In particular, multipath in an indoor environment is very severe, with signals being reflected from most objects including walls, ceilings, floors, furniture, and people.

A number of diversity methods have been developed to mitigate the effects of multipath in communication-based systems. They include spatial, frequency, and polarization diversity. These traditional methods are designed to minimize signal cancellation which is caused by the direct and reflected signals interacting in a destructive manner. These prior art systems generally either: (a) deploy a plurality of spatially distributed receive antenna elements (spatial diversity), which are configured with a control means to continuously select the antenna element with the highest signal strength, or (b) deploy a plurality of receive antenna elements which have unique polarization (polarization diversity), which are configured with a control means to continuously select the antenna element with highest signal strength or (c) deploy a single receive antenna element configured to receive a plurality of frequencies transmitting identical information (frequency diversity), and configure a control means to continuously select the frequency with the highest signal strength. The antenna element or frequency with the highest received signal strength is then used to demodulate the communications data. These prior art diversity systems do not discriminate in any way between direct and reflected signals. A strong reflected signal with good signal strength will be accepted over a weaker direct signal. However, for positioning systems to function correctly it is vital that the direct path signal is measured, even though it may not necessarily be the signal with the highest received signal strength. Therefore, traditional prior-art communications-based diversity methods are not suited for the mitigation of multipath in positioning systems.

Traditional multipath mitigation methods for positioning systems fall into five broad categories, as described below:
  (1) improved modulation techniques;
  (2) improved receiver correlation techniques;
  (3) multipath limiting antennas;
  (4) over-determined position solutions; and
  (5) Receiver Autonomous Integrity Monitoring (RAIM).

1) Improved modulation techniques for multipath mitigation generally relate to increased chipping rates of Code Division Multiple Access (CDMA) pseudorandom number (PRN) codes. As chipping rates are increased multipath correlation is decreased. However, RF spectrum usage, receiver power consumption and receiver complexity are also increased.

2) Improved receiver correlation techniques achieve multipath mitigation in the receiver correlators by making the autocorrelation tracking function more resilient to multipath perturbations. One of the more prominent techniques in this category is the so-called narrow correlator, whereby early and late correlator tracking arms are reduced from the conventional one-half chip spacing down to one-tenth chip spacing. This narrower spacing is free of long delay multipath, however is still susceptible to short delay multipath. The narrow correlator technique also requires extended receiver bandwidth to improve the sharpness of the autocorrelation function, which increases receiver power consumption and complexity.

3) Multipath-limiting antennas shape the receive and/or transmit antenna gain pattern to reduce the strength of reflected, off-axis signals. The most common form of this antenna is the so-called choke ring antenna, generally used in GPS applications for mitigating ground reflections. Multipath-limiting antenna methods orient the beam pattern of the antenna in one direction and, as such, have limited application in high multipath environments such as indoors, where signals reflect from many directions.

4) Over-determined position solutions use more transmitters than required to form a position solution. This improves position accuracy by decreasing the significance of multipath corrupted positioning signals in the position solution. An added advantage is the improved geometry provided by more geometrically diverse transmitters. However, for this method to be effective, the majority of positioning signals must be non-corrupt at any given time. This is generally not the case in high multipath environments.

5) Receiver Autonomous Integrity Monitoring (RAIM) is an algorithm employed by position receivers to check the integrity of received positioning signals, and hence eliminate outlier measurements from position solutions. In its simplest form a RAIM algorithm observes range residuals from different combinations of transmitter positioning signals to determine multipath-corrupted outlier ranges. Transmitters that are associated with large range residuals are deemed multipath corrupted and are eliminated from the position solution. Different transmitter combinations are achieved by using redundant positioning signal measurements from additional transmitters. Therefore, the RAIM method requires a significant number of redundant transmitters to provide an effective multipath mitigation tool, which in many cases is highly impractical. Furthermore, if the RAIM algorithm deems a positioning signal to be multipath corrupted, the transmitter is eliminated from the position solution, which further reduces geometric diversity.

Geometry-Free Positioning Signals

Geometry-free positioning signals are defined as unique positioning signals that are transmitted on individual carrier frequencies from the same location, such that the unit vector and geometric range of each unique positioning signal is identical with respect to an observing receiver. This requires the transmission of a plurality of frequencies through the same phase centre of the same physical antenna array, which in practice becomes increasingly difficult as the frequencies become dispersed. Furthermore, accurate chronological synchronization of geometry-free positioning signals is also difficult, as the group delay and line biases of the electronic components within each frequencies transmission path independently vary with temperature and voltage. Geometry-Free positioning signals are generally used for the determination of so called "cycle slips" in carrier-based positioning systems. A cycle slip is a sudden integer, or half cycle jump in the carrier phase observable of a positioning signal, caused by a loss of lock of the observing receiver carrier tracking loop (generally a phase-lock-loop). In single frequency positioning systems it has proven difficult to accurately and reliably detect and repair cycle slips. Traditional cycle slip detection methods have utilized linear combinations of geometry-free observables, typically between the GPS L1 and L2 carrier frequencies. These geometry-free methods detect cycle slips by observing discontinuities in the Integrated Carrier Phase (ICP) time series of the geometry-free positioning signals. However, these prior art methods do not consider the coherence of geometry-free range measurements in determining multipath corruption.

Prior art systems (a) cannot distinguish between direct and multipath corrupted positioning signals transmitted from substantially the same location, (b) cannot provide multipath mitigation without redundant geometrically-diverse transmitters, (c) cannot provide a diversity system free from the encumbrance of time varying group delay, and (d) cannot improve multipath mitigation without increased transmission bandwidths, increased receiver power consumption, and increased receiver complexity. A system that can provide precise range measurements without any of these constraints is highly desirable.

Definition of Terms

Range vector—A range vector is a vector that defines the spatial relationship of two points in space by defining the direction and distance from the first point to the second point. For example, given two points in space, $p_1$ and $p_2$, with associated position vectors $\vec{k}$ and $\vec{k}$, the range vector $\vec{k}$ from $p_1$ to $p_2$ is defined as vector subtraction of the position vectors, such that $\vec{k}=\vec{k}-\vec{k}$. $\vec{k}$ defines the direction and distance from point $p_1$ to $p_2$.

Geometric range—Geometric range is the scalar distance between two points in space. For example, the geometric range of a range vector $\vec{k}$ is defined as $|\vec{k}|$.

Unit vector—A unit vector is a vector with a magnitude of unity. Unit vectors are used to define direction. For example, the direction of a range vector, $\vec{k}$, can be represented by a unit vector, $\hat{r}$, that has the same direction as $\vec{k}$ and unity magnitude.

Diversity—Diversity, as set forth in the present invention, is the transmission and/or reception of radio signals which exhibit unique radio reflections in radio reflective (multipath) environments. Diversity generally is accomplished using either spatial, frequency, or polarization means.

Diverse radio links—Diverse radio links, or radio link diversity, are radio signals which employ diversity methods.

Transmit cluster—A plurality of unique positioning signals which are each synchronously transmitted from substantially the same location, whilst retaining radio link diversity, are known as a 'transmit cluster'.

Receive cluster—A plurality of discrete positioning signals which are each synchronously received at substantially the same receive location, whilst retaining radio link diversity, are known as a 'receive cluster'.

Substantially coherent positioning signals—Substantially coherent positioning signals are positioning signals that when received and interpreted by an observing receiver produce measurements that are substantially similar.

Positioning-Unit Device—A Positioning-Unit Device is a form of positioning transmitter, which transmits positioning signals.

Observing receiver—An observing receiver is a receiver that receives and interprets positioning signals.

OBJECT OF THE INVENTION

It is an object of the present invention to provide a diversity system and method which can distinguish between direct and multipath corrupted positioning signals transmitted from substantially the same location.

It is yet a further object of the present invention to provide a diversity system and method which can distinguish between direct and multipath corrupted positioning signals received at substantially the same location.

It is yet a further object of the present invention to provide a diversity system and method for making precise positioning signal measurements, in the presence of multipath, without the need for redundant transmitters.

It is yet a further object of the present invention to provide a diversity system and method for making precise positioning signal measurements free from the encumbrance of time varying group delay.

It is yet a further object of the present invention to provide a positioning system and method for making precise position determinations, in the presence of multipath, without the need for increased transmission bandwidths.

It is yet a further object of the present invention to provide a diversity system and method for estimating precise positioning signal measurements, in the presence of multipath, which have been transmitted and/or received from substantially the same location.

SUMMARY OF THE INVENTION

The foregoing objects of the present invention are achieved by means of interpreting a plurality of synchronous positioning signals, received through diverse radio links which exhibit substantially equal geometric ranges and unit vectors with respect to an observing receiver. The observing receiver is configured to compare and then select substantially coherent positioning signals, and/or create a best-fit estimate of the measured positioning signals, such that accurate position measurements can be determined in multipath-affected environments.

OVERVIEW

Figure 1:
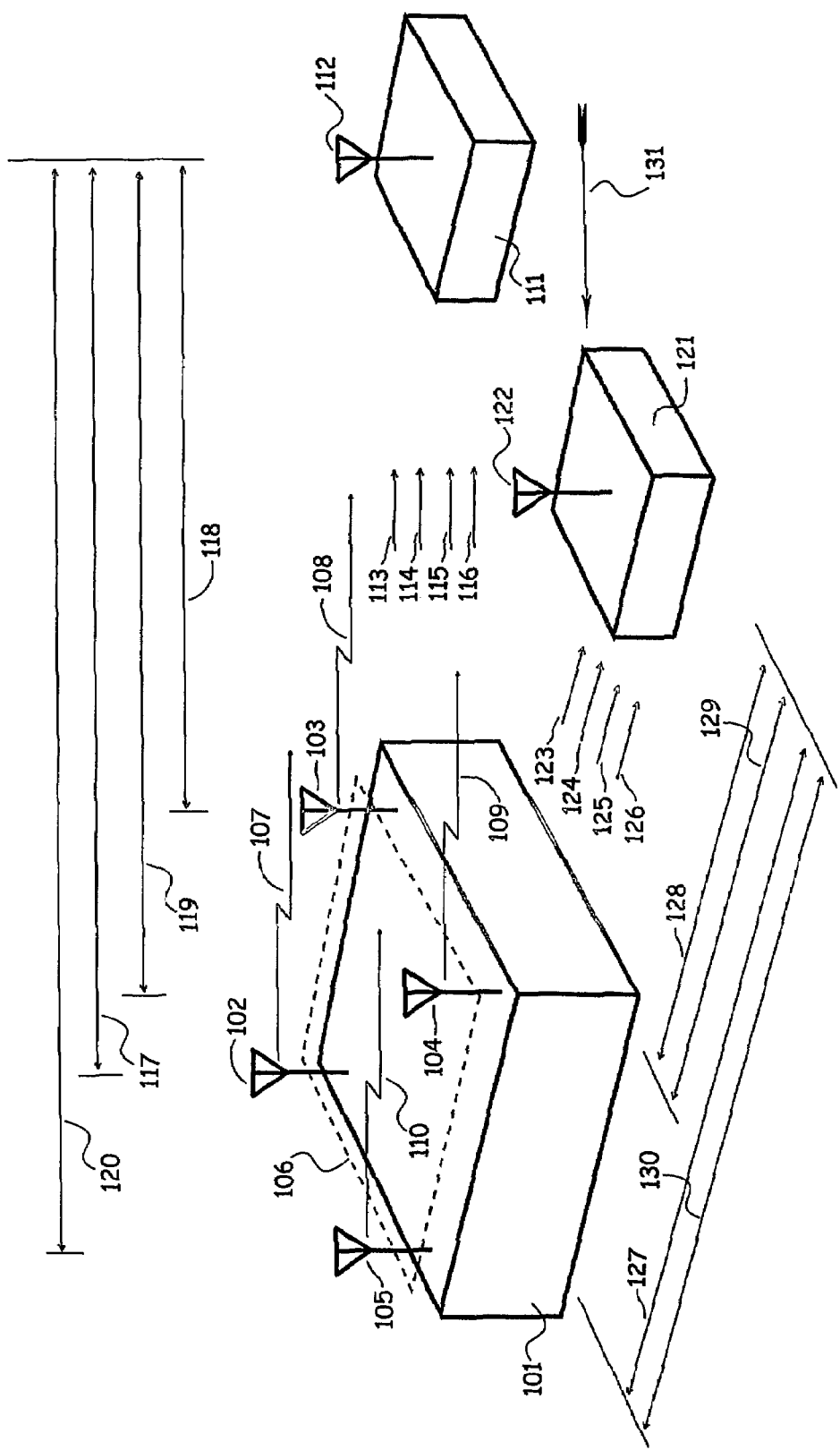
FIG. 1 is a graphical representation of the first embodiment of a transmit cluster according to the present invention, whereby a Positioning-Unit Device which incorporates a spatially diverse transmit cluster, is broadcasting four unique positioning signals through four spatially distributed antenna elements to an observing receiver in a multipath-free environment.

The present invention discloses a system and method for the mitigation of code and carrier-phase multipath in positioning systems by means of interpreting synchronous independent positioning signals, received through diverse radio links, which exhibit substantially equal geometric ranges and unit vectors with respect to an observing receiver. These diverse radio links are known as a 'cluster' of positioning signals. In multipath-free conditions a cluster of positioning signals provide substantially coherent measurements at an observing receiver. This coherence of positioning signal measurement is due to the geometric range and unit vector for each positioning signal being substantially the same with respect to the observing receiver. However, in multipath conditions an observing receiver will not measure all positioning signals from a cluster coherently. Positioning signal coherence degrades in multipath environments due to radio link diversity creating disparate multipath reflections, which affect the positioning signal measurements of each link individually. The amount of coherence between positioning signals is dependant upon the severity of the multipath environment.

Furthermore, the present invention discloses means of interpreting a plurality of synchronous unique positioning signals, received through diverse radio links which exhibit substantially equal geometric ranges and unit vectors with respect to an observing receiver. The observing receiver is configured to (a) determine synchronous unique positioning signals which exhibit substantially equal geometric ranges and unit vectors with respect to itself, (b) compare and then select substantially coherent positioning signals, and/or create a best-fit estimate of the determined synchronous unique positioning signals, and (c) determine a filtered or best-fit position solution, such that optimal range measurements and subsequent accurate position solutions can be determined in multipath-affected environments.

In the preferred embodiment of the present invention an observing receiver is configured to compare a cluster of positioning signals and then select substantially coherent positioning signals, such that multipath-corrupted links are eliminated from the range measurement. In a further embodiment of the present invention an observing receiver is configured to create a best-fit estimate from a cluster of positioning signals, such that a substantially multipath-free range measurement is determined. Therefore, the present invention provides the ability to discriminate between direct path signals and multipath-corrupt signals using positioning signals transmitted from and/or received at substantially the same location. Accurate position solutions, free from the deleterious effects of multipath, can subsequently be calculated by the observing receiver once sufficient transmitters are in-view.

System and Method

A first embodiment of the present invention discloses the transmission of synchronous unique positioning signals through a plurality of spatially distributed transmit antenna elements. All transmit antenna elements are positioned with substantially equal geometric ranges and unit vectors with respect to an observing receiver and preferably spaced at one-half of the transmitted carrier wavelength, or less, apart. Each antenna element is positioned at a known location and transmitting a unique positioning signal. Preferably, each unique positioning signal is encoded with a unique pseudorandom number (PRN) code, so as to create a Code Division Multiple Access (CDMA) system, with all unique positioning signals being transmitted on identical carrier frequencies. An observing receiver is configured to receive and interpret the plurality of transmitted unique positioning signals, so as to differentiate multipath corrupted signals from multipath-free direct path signals, and therefore mitigate the deleterious effect of multipath on positioning signal accuracy.

Referring now to FIG. 1, there is depicted a multipath-free environment, whereby a Positioning-Unit Device 101 incorporates four spatially distributed antenna elements 102, 103, 104 & 105 which are collectively known as a transmit cluster 106. Positioning-Unit Device 101 is transmitting four synchronous unique pseudorandom number (PRN) codes 107, 108, 109, & 110 via the four spatially distributed antenna elements 102, 103, 104 & 105. The spatially distributed antenna elements 102, 103, 104 & 105 are positioned at known locations, which are preferably spaced at one-half of the transmitted carrier wavelength or less apart. Each antenna element transmits a unique positioning signal on the same carrier frequency. There is also depicted an observing receiver at a first time instant 111, which receives the four synchronous unique pseudorandom number (PRN) codes 107, 108, 109, & 110 via a single receive antenna 112. The unit vectors 113, 114, 115, & 116, and the geometric ranges 117, 118, 119, & 120 of the four synchronous unique pseudorandom number (PRN) codes 107, 108, 109, & 110, are substantially equal between the transmit cluster 106 and the receive antenna 112. Also depicted is the observing receiver at a second time instant 121, which receives the four synchronous unique pseudorandom number (PRN) codes 107, 108, 109, & 110 via a single receive antenna 122. Again, the unit vectors 123, 124, 125, & 126, and the geometric ranges 127, 128, 129, & 130 of the four synchronous unique pseudorandom (PRN) codes 107, 108, 109, & 110 are substantially equal between the transmit cluster 106 and the receive antenna 122.

As depicted by the trajectory line 131 the observing receiver moves from its original position 111, toward the Positioning-Unit Device 101, to its new location 121. During this move along the trajectory line 131 the observing receiver pseudoranges and Integrated Carrier Phase (ICP) measurements for all unique pseudorandom number (PRN) codes 107, 108, 109, & 110 from the transmit cluster 106 are proportionally decreasing. Concurrently, the observing receiver Doppler measurements and signal strengths for all unique pseudorandom number (PRN) codes 107, 108, 109, & 110 from the transmit cluster 106 are proportionally increasing. At the conclusion of the move 121 the geometric ranges 127, 128, 129, & 130 and unit vectors 123, 124, 125, & 126 of the observing receiver antenna 122 to the Positioning-Unit Device cluster 106 has changed, but importantly the relative relationship of unit vectors 123, 124, 125, & 126 and geometric ranges 127, 128, 129, & 130 between the four synchronous unique pseudorandom number (PRN) codes 107, 108, 109, & 110 has not substantially changed. All measurements from the four synchronous unique pseudorandom number (PRN) codes 107, 108, 109, & 110 have remained substantially equal. Therefore, it can be seen that in multipath-free environments a spatially diverse cluster of transmitted positioning signals, which exhibit substantially equal geometric ranges and unit vectors with respect to an observing receiver, will provide substantially coherent positioning signal measurements.

Figure 2:
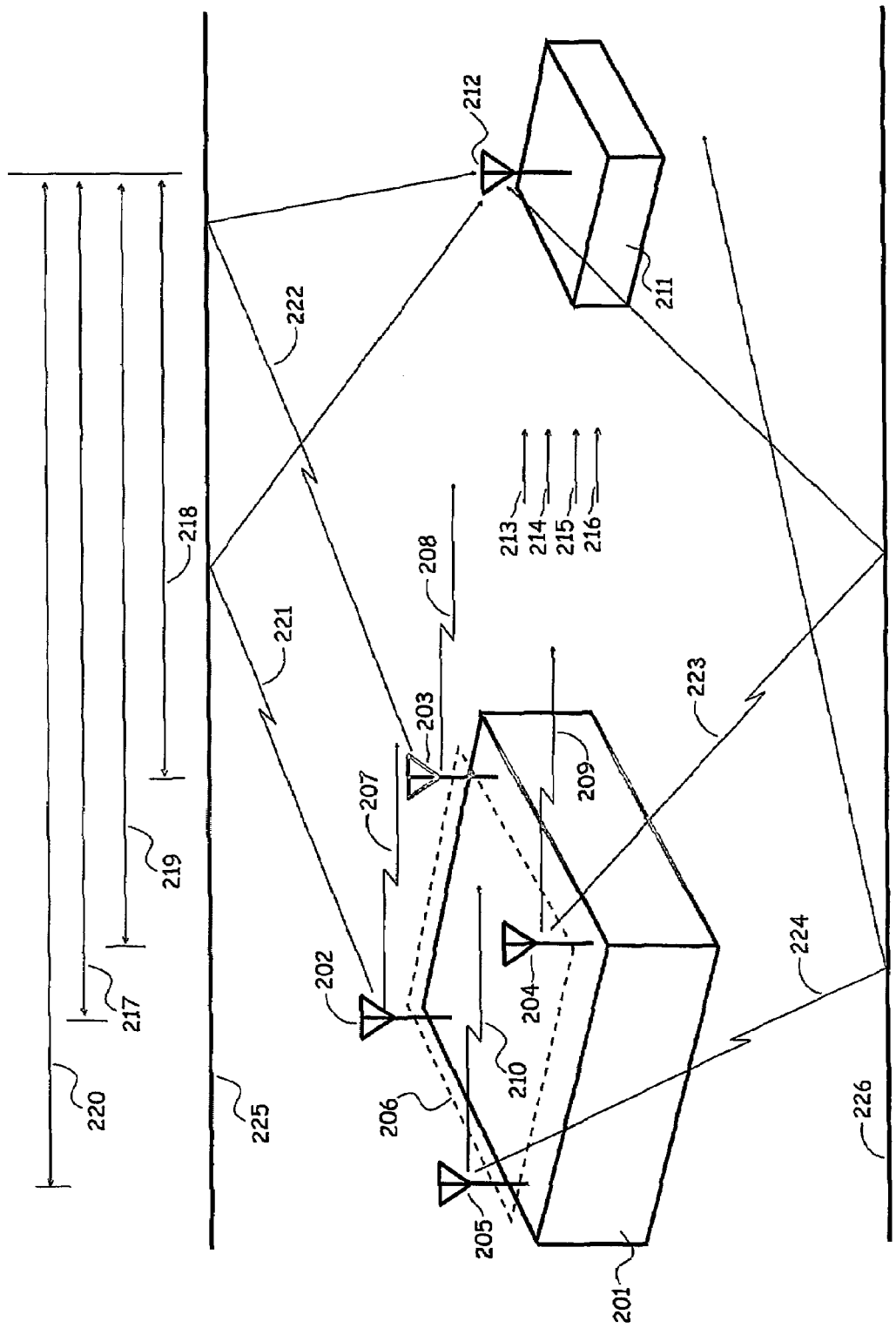
FIG. 2 is a graphical representation of the first embodiment of a transmit cluster according to the present invention, whereby a Positioning-Unit Device which incorporates a spatially diverse transmit cluster, is broadcasting four unique positioning signals through four spatially distributed antenna elements to an observing receiver in a multipath corrupted environment.

Referring now to FIG. 2, there is depicted a multipath environment, whereby a Positioning-Unit Device 201 incorporates four spatially distributed antenna elements 202, 203, 204 & 205 which are collectively known as a transmit cluster 206. Positioning-Unit Device 201 is transmitting four synchronous unique pseudorandom number (PRN) codes 207, 208, 209, & 210 via the four spatially distributed antenna elements 202, 203, 204 & 205. The spatially distributed antenna elements 202, 203, 204 & 205 are positioned at known locations, with each element transmitting a unique positioning signal on the same carrier frequency. There is also depicted an observing receiver 211, which receives the four synchronous unique pseudorandom number (PRN) codes 207, 208, 209 & 210 via a single receive antenna 212. The unit vectors 213, 214, 215, & 216, and the geometric ranges 217, 218, 219, & 220 of the four synchronous unique pseudorandom (PRN) codes 207, 208, 209 & 210 are substantially equal between the transmit cluster 206 and the receive antenna 212. Also depicted, for illustrative purpose, are four spectral multipath components 221, 222, 223, & 224, each relating to a specific unique pseudorandom number (PRN) code 207, 208, 209 & 210, which has been generated from a specific spatially distributed antenna element 202, 203, 204 & 205.

The first spectral multipath signal 221 is generated from the first unique pseudorandom number (PRN) code 207 which has been transmitted from the first spatially distributed antenna element 202. This spectral multipath signal 221 reflects off surface 225 and arrives at the receive antenna 212 with a one hundred and eighty degree phase shift with respect to the transmitted unique pseudorandom number (PRN) code 207, and therefore creates destructive cancellation of the first unique pseudorandom number (PRN) code 207. This destructive cancellation creates low received signal strength and destabilization of pseudorandom number (PRN) code and carrier phase tracking loops within the observing receiver 211. This tracking loop destabilization substantially degrades pseudorange and Integrated Carrier Phase (ICP) measurement accuracy from the first unique pseudorandom number (PRN) code 207.

The second spectral multipath signal 222 is generated from the second unique pseudorandom (PRN) code 208 which has been transmitted from the second spatially distributed antenna element 203. This spectral multipath signal 222 reflects off surface 225 and arrives at the receive antenna 212 with a zero degree phase shift with respect to the second unique pseudorandom (PRN) code 208, and therefore provides constructive addition of the second unique pseudorandom number (PRN) code 208. This constructive addition creates a high received signal strength with zero phase shift. The pseudorandom number (PRN) code and carrier phase tracking loops within the observing receiver 211 remain stable, which does not alter Integrated Carrier Range (ICP) measurements from the second unique pseudorandom number (PRN) code 208.

The third spectral multipath signal 223 is generated from the third unique pseudorandom number (PRN) code 209 which has been transmitted from the third spatially distributed antenna element 204. This spectral multipath signal 223 reflects off surface 226 and arrives at the receive antenna 212 with a ninety degree phase shift with respect to the third unique pseudorandom number (PRN) code 209, and therefore creates a moderate destructive cancellation of the third unique pseudorandom number (PRN) code 209. This moderate destructive cancellation creates moderately low received signal strengths with an associated phase tracking error. The pseudorandom number (PRN) code and carrier phase tracking loops within the observing receiver 211 are moderately affected, which moderately alters the pseudorange and Integrated Carrier Phase (ICP) measurements from the third unique pseudorandom number (PRN) code 209.

The forth spectral multipath signal 224 is generated from the forth unique pseudorandom number (PRN) code 210 which has been transmitted from the forth spatially distributed antenna element 205. This spectral multipath signal 224 reflects off surface 226 and is not received by the receive antenna 212, and therefore does not create any disturbance of the forth unique pseudorandom number (PRN) code 210. Received signal strengths remain the same with no associated phase tracking error. The pseudorandom number (PRN) code and carrier phase tracking loops within the observing receiver 211 remain unaffected, which leaves the pseudorange and Integrated Carrier Phase (ICP) measurements from the forth unique pseudorandom number (PRN) code 210 unaltered.

The observing receiver is configured to receive and interpret the four synchronous unique pseudorandom number (PRN) codes 207, 208, 209, & 210 transmitted from the four spatially distributed antenna elements 202, 203, 204 & 205, combined with the four spectral multipath components 221, 222, 223, & 224. The configuration is arranged to select substantially coherent unique pseudorandom number (PRN) codes 208 & 210 and/or provide a best-fit estimate of the pseudorange, Integrated Carrier Phase (ICP), Doppler, and signal strength measurements between the transmit cluster 206 and the observing receiver antenna 212.

Figure 3:
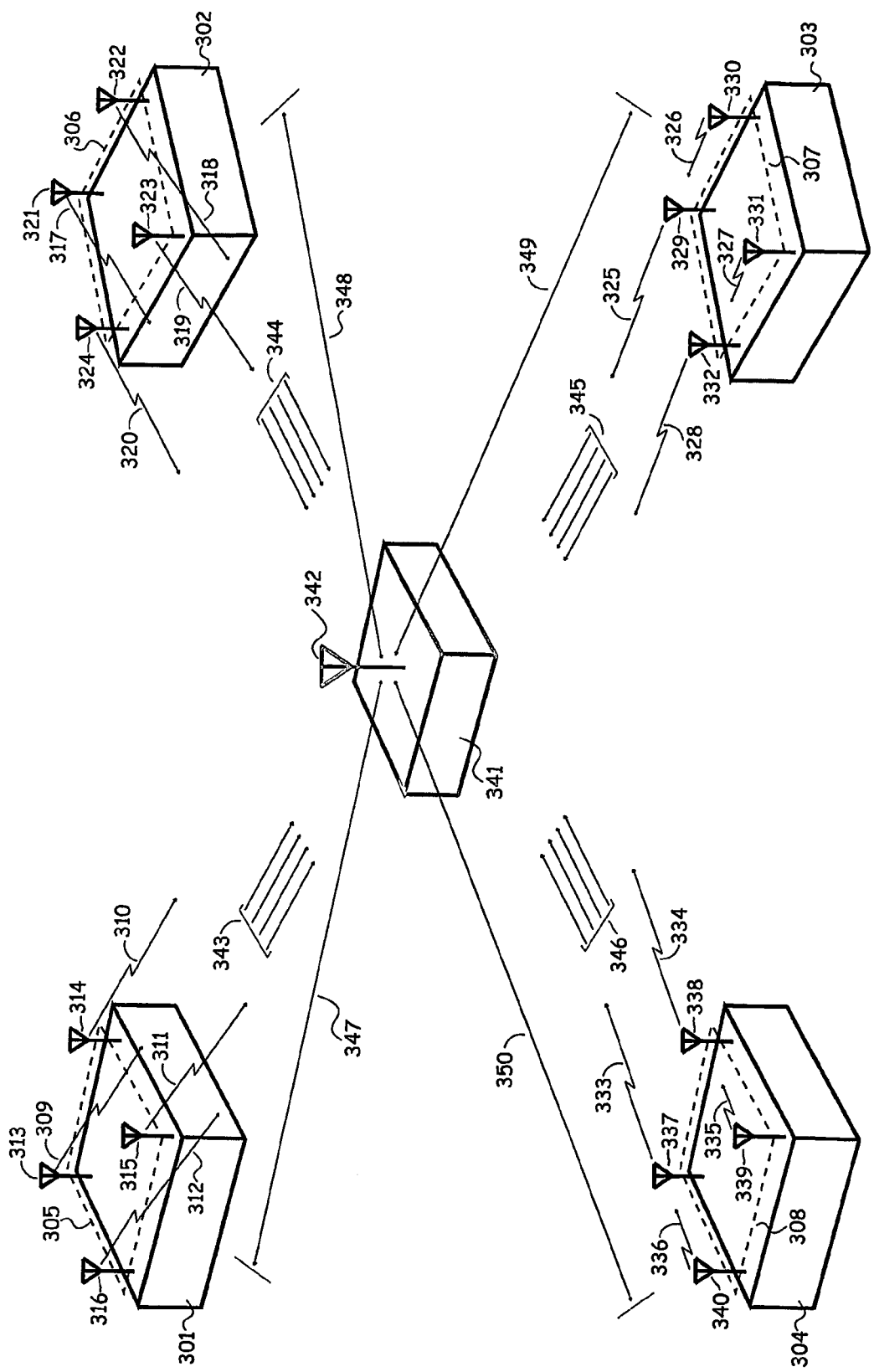
FIG. 3 is a graphical representation of the first embodiment of transmit clusters according to the present invention, whereby a network of four chronologically synchronized Positioning-Unit Devices which each incorporate a spatially diverse transmit cluster, is broadcasting sixteen unique positioning signals through sixteen spatially distributed antenna elements to an observing receiver.

Referring now to FIG. 3, there is depicted a network of four chronologically synchronized Positioning-Unit Devices 301, 302, 303, & 304, each configured with a spatially distributed transmit cluster 305, 306, 307, & 308 transmitting on identical carrier frequencies. The first transmit cluster 305 transmits four synchronous unique pseudorandom number (PRN) codes 309, 310, 311, & 312 via four spatially distributed antenna elements 313, 314, 315 & 316. The second transmit cluster 306 transmits four synchronous unique pseudorandom number (PRN) codes 317, 318, 319, & 320 via four spatially distributed antenna elements 321, 322, 323 & 324. The third transmit cluster 307 transmits four synchronous unique pseudorandom number (PRN) codes 325, 326, 327, & 328 via four spatially distributed antenna elements 329, 330, 331 & 332. The forth transmit cluster 308 transmits four synchronous unique pseudorandom number (PRN) codes 333, 334, 335, & 336 via four spatially distributed antenna elements 337, 338, 339 & 340. All spatially distributed antenna elements 313, 314, 315, 316, 321, 322, 323, 324, 329, 330, 331, 332, 337, 338, 339 & 340 are positioned at known locations, with each element transmitting a unique positioning signal on the same carrier frequency. There is also depicted an observing receiver 341, which receives the sixteen synchronous unique pseudorandom number (PRN) codes 309, 310, 311, 312, 317, 318, 319, 320, 325, 326, 327, 328, 333, 334, 335, & 336 from the four spatially distributed transmit clusters 305, 306, 307, & 308 via a receive antenna 342. The unit vectors 343, 344, 345, & 346 and the geometric ranges 347, 348, 349, & 350 of the four synchronous unique pseudorandom number (PRN) codes generated from each transmit cluster, are substantially equal between each transmit cluster and the receive antenna 342.

The observing receiver 341 requires sufficient Positioning-Unit Devices to be in view to determine a position solution. Preferably, the observing receiver 341 utilizes at least three Positioning-Unit Devices to determine a two-dimensional position solution, or at least four Positioning-Unit Devices to determine a three-dimensional position solution. However, position solutions determined by the observing receiver 341 utilizing less than three Positioning-Unit Devices remains within the broad scope and ambit of the present invention. The observing receiver 341 is configured to receive and interpret the sixteen synchronous unique positioning signals transmitted from the four Positioning-Unit Devices 301, 302, 303, & 304, such that accurate position can be determined. The observing receiver can:

1) Supply all received unique positioning signal pseudoranges, Integrated Carrier Phase (ICP), Doppler, and signal strength measurements to the observing receiver positioning algorithm, ready to produce an over-determined position solution given sufficient Positioning-Unit Devices in-view. The location of each transmit antenna element within each transmit cluster may also be provided to the observing receiver positioning algorithm, to assist accurate pseudorange and Integrated Carrier Phase (ICP) measurement determination between each transmit antenna element and the observing receiver antenna, 2) Supply all received unique positioning signal pseudoranges, Integrated Carrier Phase (ICP), Doppler, and signal strength measurements to the observing receiver positioning algorithm, which employs a RAIM (Receiver Autonomous Integrity Monitoring) algorithm. With sufficient Positioning-Unit Devices in-view the RAIM algorithm selects the least multipath corrupted positioning signals from each Positioning-Unit Device transmit cluster and subsequently uses these best-fit signals in the position solution. The location of each transmit antenna element within each cluster may also be provided to the observing receiver positioning algorithm, to assist accurate pseudorange and Integrated Carrier Phase (ICP) measurement determination between each transmit antenna element and the observing receiver antenna, 3) Supply all received unique positioning signal pseudoranges, Integrated Carrier Phase (ICP), Doppler, and signal strength measurements to the observing receiver positioning algorithm, which employs an appropriate mathematical algorithm to produce a best-fit position solution, for example a Kalman Filter. The positioning algorithm estimates the best range measurement from each Positioning-Unit Device using all pseudorange, Integrated Carrier Phase (ICP), Doppler, and signal strength measurements available to the positioning algorithm from all Positioning-Unit Devices in view. The location of each transmit antenna element within each cluster may also be provided to the observing receiver positioning algorithm, to assist accurate pseudorange and Integrated Carrier Phase (ICP) measurement determination between each transmit antenna element and the observing receiver antenna, 4) Combine and average all received unique positioning signal pseudoranges, Integrated Carrier Phase (ICP), Doppler, and signal strength measurements from each transmit cluster to form mean pseudorange, Integrated Carrier Phase (ICP), Doppler, and signal strength measurements. These mean cluster positioning signal measurements, along with the apparent mean location of all antenna elements within the transmit cluster, are subsequently supplied to the observing receiver positioning algorithm, ready to produce a position solution once sufficient Positioning-Unit Devices are in-view, 5) Supply all received unique positioning signal pseudoranges, Integrated Carrier Phase (ICP), Doppler, and signal strength measurements from a transmit cluster to the observing receiver range estimator algorithm. The range estimator algorithm estimates the best-fit range measurement received from a transmit cluster, before passing a best-fit pseudorange, Integrated Carrier Phase (ICP), Doppler, and signal strength measurement to the observing receiver positioning algorithm. The range estimator algorithm may include any appropriate mathematical algorithm which produces a best-fit solution, such as, for example, a least squares regression, weighted least squares regression, weighted mean, filtered estimate, smoothed estimate or similar technique known to those skilled in the art. These best-fit positioning signal measurements, along with the apparent best-fit location of all antenna elements within the transmit cluster, are subsequently supplied to the observing receiver positioning algorithm, ready to produce a position solution once sufficient Positioning-Unit Devices are in-view, 6) Determine the coherence between all received unique positioning signals from each cluster by comparing information selected from the group comprising of in-phase and quadrature (I & Q) carrier tracking loop measurements, pseudorandom code tracking loop measurements, pseudoranges, Integrated Carrier Phase (ICP) measurements, Doppler measurements, and received signal strengths, to:
   a) select substantially coherent unique positioning signals from each transmit cluster for supply to the observing receiver positioning algorithm, ready to produce an over-determined position solution once sufficient Positioning-Unit Devices are in-view. The location of each selected transmit antenna element within each cluster may also be provided to the observing receiver positioning algorithm, such that accurate pseudorange and Integrated Carrier Phase (ICP) measurements can be determined,
   b) select substantially coherent unique positioning signals from each transmit cluster for supply to the observing receiver positioning algorithm, which employs a RAIM (Receiver Autonomous Integrity Monitoring) algorithm. With sufficient Positioning-Unit Devices in-view the RAIM algorithm selects the least multipath corrupted positioning signals from each Positioning-Unit Device transmit cluster and subsequently uses these best-fit signals in the position solution. The location of selected transmit antenna elements within each cluster may also be provided to the observing receiver positioning algorithm, to assist accurate pseudorange and Integrated Carrier Phase (ICP) measurement determination between each transmit antenna element and the observing receiver antenna, c) select substantially coherent unique positioning signals from each transmit cluster for supply to the observing receiver positioning algorithm, which employs an appropriate mathematical algorithm to produce a best-fit solution, for example a Kalman Filter. The positioning algorithm estimates the best range measurement from each Positioning-Unit Device using all selected substantially coherent pseudorange, Integrated Carrier Phase (ICP), Doppler, and signal strength measurements available to the positioning algorithm from all Positioning-Unit Devices in view. The location of each selected transmit antenna element within each cluster may also be provided to the observing receiver positioning algorithm, to assist accurate pseudorange and Integrated Carrier Phase (ICP) measurement determination between each transmit antenna element and the observing receiver antenna, d) select substantially coherent unique positioning signals from each transmit cluster for combining and averaging of pseudoranges, Integrated Carrier Phase (ICP), Doppler, and signal strength measurements to form mean pseudorange, Integrated Carrier Phase (ICP), Doppler, and signal strength measurements. These mean cluster positioning signal measurements, along with the apparent mean location of all selected antenna elements within the transmit cluster, are subsequently supplied to the observing receiver positioning algorithm, ready to produce a position solution once sufficient Positioning-Unit Devices are in-view, e) select substantially coherent unique positioning signals from each transmit cluster and estimate best-fit range measurements using a best-fit range estimator algorithm, such as a least squares regression, weighted least squares regression, weighted mean, filtered estimate, smoothed estimate or similar technique known to those skilled in the art. The estimated pseudorange, Integrated Carrier Phase (ICP), Doppler, and signal strength measurements, along with the apparent best-fit estimate of selected antenna element locations, are subsequently supplied to the observing receiver positioning algorithm, ready to produce a position solution once sufficient Positioning-Unit Devices are in-view.

f) select substantially coherent unique positioning signals from each cluster, which are combined and averaged to form mean positioning signal measurements, which are subsequently passed to a RAIM (Receiver Autonomous Integrity Monitoring) positioning algorithm. With redundant Positioning-Unit Devices in-view the RAIM algorithm selects the least multipath corrupted mean positioning signals available and subsequently uses these best-fit signals in the position solution.

g) select substantially coherent unique positioning signals from each cluster, which are combined and averaged to form mean positioning signal measurements, which are subsequently passed to the observing receiver positioning algorithm. The positioning algorithm may include any appropriate mathematical algorithm which produces a best-fit solution, for example a Kalman Filter. The positioning algorithm estimates the best range measurement from each Positioning-Unit Device using all pseudorange, Integrated Carrier Phase (ICP), Doppler, and signal strength measurements available to the positioning algorithm from all Positioning-Unit Devices in view. The apparent mean location of selected transmit antenna elements within each cluster may also be provided to the observing receiver positioning algorithm, to assist accurate pseudorange and Integrated Carrier Phase (ICP) measurement determination between each transmit antenna element and the observing receiver antenna, h) select substantially coherent unique positioning signals from each transmit cluster, which are passed through a best-fit range estimator algorithm to form best-fit pseudorange, Integrated Carrier Phase (ICP), Doppler, and signal strength measurements. These best-fit positioning signal measurements are subsequently passed to the observing receiver positioning algorithm, which employs a RAIM (Receiver Autonomous Integrity Monitoring) algorithm. With redundant Positioning-Unit Devices in-view the RAIM algorithm selects the least multipath corrupted positioning signals available and subsequently uses these best-fit signals in the position solution.

i) select substantially coherent unique positioning signals from each transmit cluster, which are passed through a best-fit range estimator algorithm to form best-fit pseudorange, Integrated Carrier Phase (ICP), Doppler, and signal strength measurements. These best-fit positioning signal measurements are subsequently passed to the observing receiver positioning algorithm, which employs an appropriate mathematical algorithm to produce a best-fit solution, for example a Kalman Filter. The positioning algorithm estimates the best range measurement from each Positioning-Unit Device using all best-fit positioning signals from sufficient Positioning-Unit Devices in view. The location of the selected best-fit transmit antenna elements within each cluster may also be provided to the observing receiver estimator algorithm, to assist accurate pseudorange and Integrated Carrier Phase (ICP) measurement determination between each transmit antenna element and the observing receiver antenna.

Any combination of the above described embodiments fall within the broad scope and ambit of the present invention. For example, substantially coherent positioning signals can be preprocessed with a best-fit range estimator algorithm, which are subsequently processed with a best-fit positioning algorithm, which are subsequently passed through a RAIM (Receiver Autonomous Integrity Monitoring) algorithm.

Cluster Element Spacing

There is no minimum element spacing within a spatially distributed transmit cluster. The closer the elements are positioned, the greater the multipath coherence between pseudorandom number (PRN) codes becomes, and the less spatial diversity is achieved. The maximum element spacing is dictated by the minimum expected observing receiver separation from the transmit cluster. For optimum results the unit vector from each antenna element within the transmit cluster to the observing receiver must remain substantially equal. An observing receiver positioned further away from the transmit cluster will experience greater similarity of the unit vectors compared to an observing receiver positioned in close proximity. Transmit antenna element spacing of many wavelengths is practicable when the observing receiver separation is large. In the preferred embodiment a cluster of antenna elements is positioned with a one-half carrier wavelength spacing between elements to maximize the spatial diversity and minimize the unit vector dispersion. At a carrier frequency of 2.4 GHz, this represents an antenna element spacing in the order of 60 mm.

Transmit Cluster Embodiments

All of the above described receiver embodiments can also be applied to any form of transmit cluster. A transmit cluster may be configured to use, but is not limited to, spatial, frequency, or polarization diversity. Furthermore, a transmit cluster may be configured to use any combination of spatial, frequency, or polarization diversity. Three embodiments of a transmit cluster are described as follows:

a) Spatially diverse transmit cluster—A Positioning-Unit Device is configured to transmit a plurality of synchronous unique positioning signals from a plurality of spatially distributed antenna elements. The antenna elements are placed with substantially equal geometric ranges and unit vectors with respect to observing receivers, with each element situated at a known location and transmitting a unique positioning signal. The antenna element spacing is preferably one-half the carrier wavelength, and the synchronous unique positioning signals are preferably pseudorandom number (PRN) codes transmitted on identical carrier frequencies.

b) Frequency diverse transmit cluster—A Positioning-Unit Device is configured to transmit a plurality of synchronous unique positioning signals on a plurality of frequencies, with each unique positioning signal being transmitted on its own unique frequency. The plurality of positioning signals are transmitted through a single antenna element placed at a known location. The synchronous unique positioning signals are preferably pseudorandom number (PRN) codes transmitted on individual carrier frequencies.

c) Polarization diverse transmit cluster—A Positioning-Unit Device is configured to transmit a plurality of synchronous unique positioning signals from a plurality of orthogonally polarized antenna elements. The antenna elements are placed with substantially equal range and unit vectors with respect to all observing receivers, with each element situated at a known location and transmitting a unique positioning signal. The antenna elements are preferably placed in close proximity to one another, and the unique positioning signals are preferably pseudorandom number (PRN) codes transmitted on identical carrier frequencies.

In the preferred embodiment, synchronous unique pseudorandom number (PRN) codes are generated simultaneously from a Positioning-Unit Device and are transmitted simultaneously from each antenna element within a transmit cluster. In alternate embodiments, the synchronous unique pseudorandom number (PRN) codes may be successively generated within a Positioning-Unit Device and be successively transmitted through each antenna element within a transmit cluster in a time division multiple access (TDMA) scheme, such that each element transmits a unique pseudorandom number (PRN) code in a unique time slot.

Cluster Determination

An observing receiver, when acquiring unique positioning signals, first determines which unique positioning signals are associated with each particular transmit cluster. The observing receiver receives each unique positioning signal and interprets navigation data contained therein to determine the location of each transmit antenna element. The observing receiver determines which transmit antenna element locations are within a close proximity to one another and whether the transmit antenna elements exhibit substantially equal unit vectors and geometric ranges with respect to the observing receiver. The observing receiver declares transmit antenna elements which exhibit substantially equal unit vectors and geometric ranges with respect to the observing receiver to be a transmit cluster. Furthermore, each unique positioning signal can transmit cluster identification data within its navigation data message, and therefore allow association of each unique positioning signal with a specific transmit cluster. The observing receiver receives and interprets this cluster identification data to identify and associate each unique positioning signal with each transmit cluster.

Receive Cluster

A unique positioning signal received at an observing receiver through diverse receive antenna elements, which are individually interpreted through separate receive channels, creates a plurality of discrete positioning signals. These discrete positioning signals exhibit substantially coherent measurements in multipath-free environments due to the unit vector and geometric range from each receive antenna element to the transmitter being substantially equal. However, in a multipath environment the discrete positioning signals received from diverse receive antenna elements exhibit non-coherent positioning measurements at an observing receiver. This non-coherence is due to the observing receiver measuring different reflected path signals from each receive antenna element which, when combined with their respective direct signals, cause different range and signal strength measurements for each positioning signal. The amount of non-coherence between positioning signals is dependant upon the severity of the multipath environment.

The present invention discloses mitigation of code and carrier-phase multipath in positioning systems by means of receiving a unique positioning signal through a plurality of spatially distributed receive antenna elements, or receiving a unique positioning signal through a plurality of polarization diverse receive antenna elements. All receive antenna elements are positioned with substantially equal geometric ranges and unit vectors with respect to the transmitted signal, with each element positioned in a known relation to one another and individually receiving the same unique positioning signal. Preferably, all receive antenna elements are positioned one-half carrier wavelength, or less, apart. The observing receiver is configured to individually receive, track, and interpret the plurality of discrete positioning signals, so as to mitigate the deleterious effect of multipath on positioning accuracy.

Figure 4:
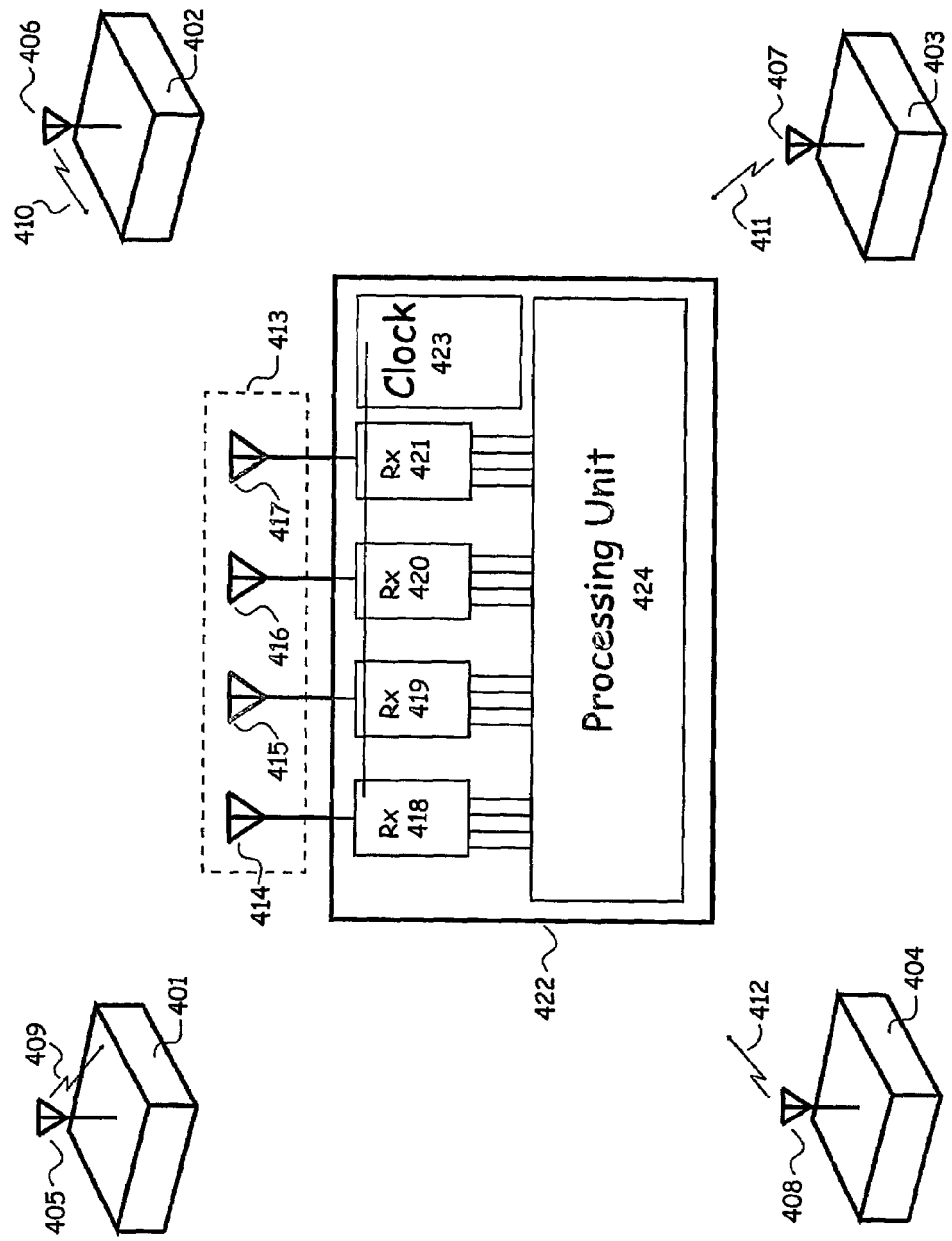
FIG. 4 is a graphical representation of the first embodiment of a receive cluster according to the present invention, whereby an observing receiver, which incorporates a spatially diverse receive cluster, is receiving sixteen discrete positioning signals from four Positioning-Unit Devices through four spatially distributed receive antenna elements.

Referring now to FIG. 4, there are depicted four Positioning-Unit Devices 401, 402, 403, & 404, each configured with a single transmit antenna element 405, 406, 407, & 408 positioned at known locations and each configured to transmit a unique synchronous positioning signal 409, 410, 411, & 412. Also depicted is a spatially diverse receive cluster 413, which incorporates four spatially distributed receive antenna elements 414, 415, 416, & 417. Each receive antenna element 414, 415, 416, & 417 is connected to a discrete receiver path 418, 419, 420, & 421 within an observing receiver 422. Each receiver path 418, 419, 420, & 421 is synchronized from a common receiver clock 423 and fed to a processing unit 424. The discrete receive antenna elements 414, 415, 416, & 417 which are connected to discrete receiver paths 418, 419, 420, & 421 create four discrete pseudorange, Integrated Carrier Phase (ICP), Doppler, and signal strength measurements for each received unique positioning signal 409, 410, 411, & 412, and thus create sixteen discrete positioning signals for the four Positioning-Unit Devices in-view 401, 402, 403, & 404. The processing unit 424 is configured to receive these sixteen discrete positioning signals and:

1) Supply all received discrete positioning signal pseudoranges, Integrated Carrier Phase (ICP), Doppler, and signal strength measurements to the observing receiver positioning algorithm, ready to produce an over-determined position solution given sufficient Positioning-Unit Devices in-view. The location of each receive antenna element within the receive cluster, relative to a reference bearing, may also be provided to the observing receiver positioning algorithm, to assist accurate pseudorange and Integrated Carrier Phase (ICP) measurement determination between the transmit antenna and the observing receiver cluster, 2) Supply all received discrete positioning signal pseudoranges, Integrated Carrier Phase (ICP), Doppler, and signal strength measurements to the observing receiver positioning algorithm, which employs a RAIM (Receiver Autonomous Integrity Monitoring) algorithm. With sufficient Positioning-Unit Devices in-view the RAIM algorithm selects the least multipath corrupted positioning signals from each Positioning-Unit Device transmit cluster and subsequently uses these best-fit signals in the position solution. The location of each antenna element within the receive cluster, relative to a reference bearing, may also be provided to the observing receiver positioning algorithm, to assist accurate pseudorange and Integrated Carrier Phase (ICP) measurement determination between the transmit antenna and the observing receiver cluster, 3) Supply all received discrete positioning signal pseudoranges, Integrated Carrier Phase (ICP), Doppler, and signal strength measurements to the observing receiver positioning algorithm, which employs an appropriate mathematical algorithm to produce a best-fit position solution, for example a Kalman Filter. The positioning algorithm estimates the best range measurement from each Positioning-Unit Device using all pseudorange, Integrated Carrier Phase (ICP), Doppler, and signal strength measurements available to the positioning algorithm from all Positioning-Unit Devices in view. The location of each receive antenna element within the receive cluster, relative to a reference bearing, may also be provided to the observing receiver position estimator algorithm, to assist accurate pseudorange and Integrated Carrier Phase (ICP) measurement determination between the transmit antenna and the observing receiver cluster, 4) Combine and average all received discrete positioning signal pseudoranges, Integrated Carrier Phase (ICP), Doppler, and signal strength measurements from each Positioning-Unit Device to form mean pseudorange, Integrated Carrier Phase (ICP), Doppler, and signal strength measurements. These mean receive cluster positioning signal measurements, along with the apparent mean location of all antenna elements within the receive cluster, are subsequently supplied to the observing receiver positioning algorithm, ready to produce a position solution once sufficient Positioning-Unit Devices are in-view, 5) Supply all received discrete positioning signal pseudoranges, Integrated Carrier Phase (ICP), Doppler, and signal strength measurements from a receive cluster to the observing receiver range estimator algorithm. The range estimator algorithm estimates the best-fit range measurement from a receive cluster, before passing a best-fit pseudorange, Integrated Carrier Phase (ICP), Doppler, and signal strength measurement to the observing receiver positioning algorithm. The range estimator algorithm may include any appropriate mathematical algorithm which produces a best-fit solution, such as, for example, a least squares regression, weighted least squares regression, weighted mean, filtered estimate, smoothed estimate or similar technique known to those skilled in the art. These best-fit positioning signal measurements, along with the apparent best-fit location of all antenna elements within the receive cluster, are subsequently supplied to the observing receiver positioning algorithm, ready to produce a position solution once sufficient Positioning-Unit Devices are in-view, 6) Determine the coherence between all received discrete positioning signals from the receive cluster by comparing information selected from the group comprising of in-phase and quadrature (I & Q) carrier tracking loop measurements, pseudorandom code tracking loop measurements, pseudoranges, Integrated Carrier Phase (ICP) measurements, Doppler measurements, and received signal strengths, to:

a) select substantially coherent discrete positioning signals from each Positioning-Unit Device for supply to the observing receiver positioning algorithm, ready to produce an over-determined position solution once sufficient Positioning-Unit Devices are in-view. The location of each selected receive antenna element within the receive cluster, relative to a reference bearing, may also be provided to the observing receiver positioning algorithm, such that accurate pseudorange and Integrated Carrier Phase (ICP) measurements can be determined, b) select substantially coherent discrete positioning signals from each Positioning-Unit Device for supply to the observing receiver positioning algorithm, which employs a RAIM (Receiver Autonomous Integrity Monitoring) algorithm. With sufficient Positioning-Unit Devices in-view the RAIM algorithm selects the least multipath corrupted positioning signals from each Positioning-Unit Device and subsequently uses these best-fit signals in the position solution. The location of selected receive antenna elements within the receive cluster, relative to a reference bearing may also be provided to the observing receiver positioning algorithm, to assist accurate pseudorange and Integrated Carrier Phase (ICP) measurement determination between each transmit antenna element and the observing receiver antenna element, c) select substantially coherent discrete positioning signals from each Positioning-Unit Device for supply to the observing receiver positioning algorithm, which employs an appropriate mathematical algorithm to produce a best-fit solution, for example a Kalman Filter. The positioning algorithm estimates the best range measurement from each Positioning-Unit Device using all substantially coherent pseudorange, Integrated Carrier Phase (ICP), Doppler, and signal strength measurements available to the positioning algorithm from all Positioning-Unit Devices in view. The location of each selected receive antenna element within the receive cluster, relative to a reference bearing, may also be provided to the observing receiver positioning algorithm, to assist accurate pseudorange and Integrated Carrier Phase (ICP) measurement determination between the transmit antenna and the observing receiver cluster, d) select substantially coherent discrete positioning signals from each Positioning-Unit Device for combining and averaging of pseudoranges, Integrated Carrier Phase (ICP), Doppler, and signal strength measurements to form mean pseudorange, Integrated Carrier Phase (ICP), Doppler, and signal strength measurements. These mean cluster positioning signal measurements, along with the apparent mean location of all selected receive antenna elements within the cluster, are subsequently supplied to the observing receiver positioning algorithm, ready to produce a position solution once sufficient Positioning-Unit Devices are in-view, e) select substantially coherent discrete positioning signals from each Positioning-Unit Device and estimate best-fit range measurements using a best-fit range estimator algorithm, such as a least squares regression, weighted least squares regression, weighted mean, filtered estimate, smoothed estimate, or any other suitable range estimator algorithm. The estimated pseudorange, Integrated Carrier Phase (ICP), Doppler, and signal strength measurements, along with the best-fit estimate of selected antenna element locations, relative to a reference bearing, are subsequently supplied to the observing receiver positioning algorithm, ready to produce a position solution once sufficient Positioning-Unit Devices are in-view.

f) select substantially coherent discrete positioning signals from each Positioning-Unit Device, which are combined and averaged to form mean positioning signal measurements, which are subsequently passed to a RAIM (Receiver Autonomous Integrity Monitoring) positioning algorithm. With redundant Positioning-Unit Devices in-view the RAIM algorithm selects the least multipath corrupted mean positioning signals available and subsequently uses these best-fit signals in the position solution.

g) select substantially coherent discrete positioning signals from each Positioning-Unit Device, which are combined and averaged to form mean positioning signal measurements, which are subsequently passed to the observing receiver positioning algorithm. The positioning algorithm may include any appropriate mathematical algorithm which produces a best-fit solution, for example a Kalman Filter. The positioning algorithm estimates the best range measurement from each Positioning-Unit Device using all pseudorange, Integrated Carrier Phase (ICP), Doppler, and signal strength measurements available to the positioning algorithm from all Positioning-Unit Devices in view. The location of each receive antenna element within the receive cluster, relative to a reference bearing, may also be provided to the observing receiver estimator algorithm, to assist accurate pseudorange and Integrated Carrier Phase (ICP) measurement determination between the transmit antenna and the observing receiver cluster, or h) select substantially coherent discrete positioning signals from each Positioning-Unit Device, which are passed through a best-fit range estimator algorithm to form best-fit pseudorange, Integrated Carrier Phase (ICP), Doppler, and signal strength measurements. These best-fit measurements are subsequently passed to the observing receiver positioning algorithm, which employs a RAIM (Receiver Autonomous Integrity Monitoring) algorithm. With redundant Positioning-Unit Devices in-view the RAIM algorithm selects the least multipath corrupted positioning signals available and subsequently uses these best-fit signals in the position solution.

i) select substantially coherent discrete positioning signals from each Positioning-Unit Device, which are passed through a best-fit range estimator algorithm to form best-fit pseudorange, Integrated Carrier Phase (ICP), Doppler, and signal strength measurements. These best-fit positioning signal measurements are subsequently passed to the observing receiver positioning algorithm, which employs an appropriate mathematical algorithm to produce a best-fit solution, for example a Kalman Filter. The positioning algorithm estimates the best range measurement from each Positioning-Unit Device using all best-fit positioning signals from sufficient Positioning-Unit Devices in view. The relative location of the selected best-fit receive antenna elements within each cluster may also be provided to the observing receiver positioning algorithm, to assist accurate pseudorange and Integrated Carrier Phase (ICP) measurement determination between each transmit antenna element and the observing receiver antenna.

Any combination of the above described embodiments fall within the broad scope and ambit of the present invention. For illustrative example, substantially coherent positioning signals can be preprocessed with a best-fit range estimator algorithm, which are subsequently processed with a best-fit positioning algorithm, which are subsequently passed through a RAIM (Receiver Autonomous Integrity Monitoring) algorithm.

Receiver Interpretation

An observing receiver is configured to receive and interpret a plurality of unique and/or discrete positioning signals received from positioning signal clusters. The observing receiver assigns receive channels in accordance with the number of positioning signals to be tracked. The observing receiver subsequently acquires and autonomously tracks each positioning signal through an independent tracking channel. This autonomous tracking of positioning signals allows independent measurement of each positioning signal from a cluster, without any positioning signal measurement being affected by any adjacent multipath corrupted positioning signal. The greater the number of positioning signals available from a cluster the better the integrity of the range measurement obtained.

Figure 5:
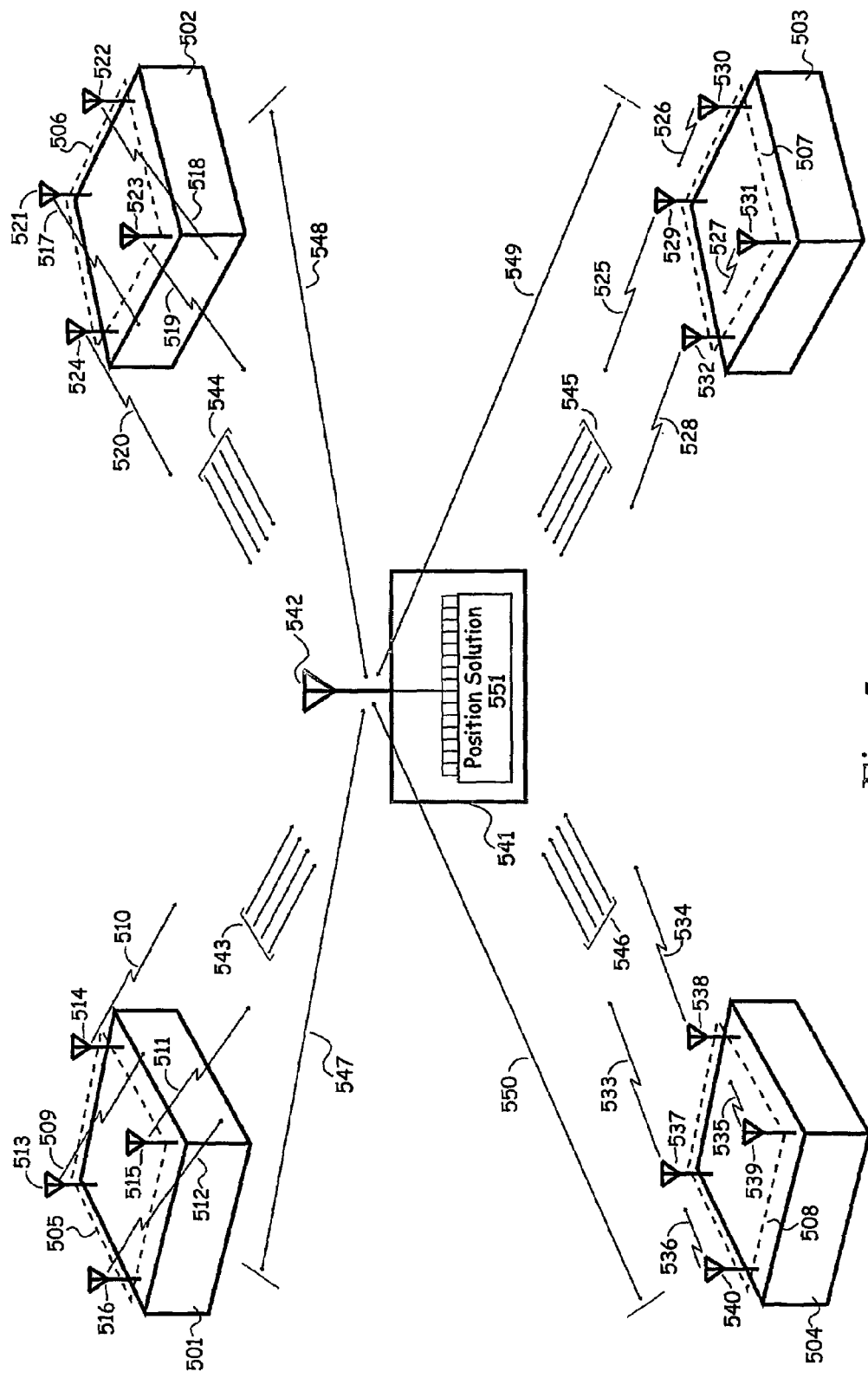
FIG. 5 is a graphical representation of an observing receiver configuration according to the present invention, whereby a network of four chronologically synchronized Positioning-Unit Devices which each incorporate a spatially diverse transmit cluster, is broadcasting sixteen unique positioning signals through sixteen spatially distributed antenna elements to an observing receiver. The observing receiver is configured to pass all sixteen unique positioning signals to a position solution algorithm.

Referring now to FIG. 5, there is depicted a network of four chronologically synchronized Positioning-Unit Devices 501, 502, 503, & 504, each configured with a spatially distributed transmit cluster 505, 506, 507, & 508 transmitting on identical carrier frequencies. The first transmit cluster 505 transmits four synchronous unique pseudorandom number (PRN) codes 509, 510, 511, & 512 via four spatially distributed antenna elements 513, 514, 515 & 516. The second transmit cluster 506 transmits four synchronous unique pseudorandom number (PRN) codes 517, 518, 519, & 520 via four spatially distributed antenna elements 521, 522, 523 & 524. The third transmit cluster 507 transmits four synchronous unique pseudorandom number (PRN) codes 525, 526, 527, & 528 via four spatially distributed antenna elements 529, 530, 531 & 532. The forth transmit cluster 508 transmits four synchronous unique pseudorandom number (PRN) codes 533, 534, 535, & 536 via four spatially distributed antenna elements 537, 538, 539 & 540. All spatially distributed antenna elements 513, 514, 515, 516, 521, 522, 523, 524, 529, 530, 531, 532, 537, 538, 539 & 540 are positioned at known locations, with each element transmitting a unique positioning signal on the same carrier frequency. There is also depicted an observing receiver 541, which receives the sixteen synchronous unique pseudorandom number (PRN) codes 509, 510, 511, 512, 517, 518, 519, 520, 525, 526, 527, 528, 533, 534, 535, & 536 from the four spatially distributed transmit clusters 505, 506, 507, & 508 via a receive antenna 542. The unit vectors 543, 544, 545, & 546 and the geometric ranges 547, 548, 349, & 550 of the four synchronous unique pseudorandom number (PRN) codes generated from each transmit cluster 505, 506, 507, & 508, are substantially equal within each transmit cluster 505, 506, 507, & 508 relative to the receive antenna 542.

The observing receiver 541 requires sufficient Positioning-Unit Devices to be in view to determine a position solution. Preferably, the observing receiver 541 utilizes at least three Positioning-Unit Devices to determine a two-dimensional position solution, or at least four Positioning-Unit Devices to determine a three-dimensional position solution. However, position solutions determined by the observing receiver 541 utilizing less than three Positioning-Unit Devices remains within the broad scope and ambit of the present invention. The observing receiver 541 is configured to pass all unique positioning signals 509, 510, 511, 512, 517, 518, 519, 520, 525, 526, 527, 528, 533, 534, 535, & 536 to the observing receiver positioning solution algorithm means 551, so as to determine either (a) an over-determined position solution, (b) a RAIM dependant position solution, (c) a position solution filtered by a position estimate algorithm, such as a Kalman filter, or (d) any combination of these solutions.

Figure 6:
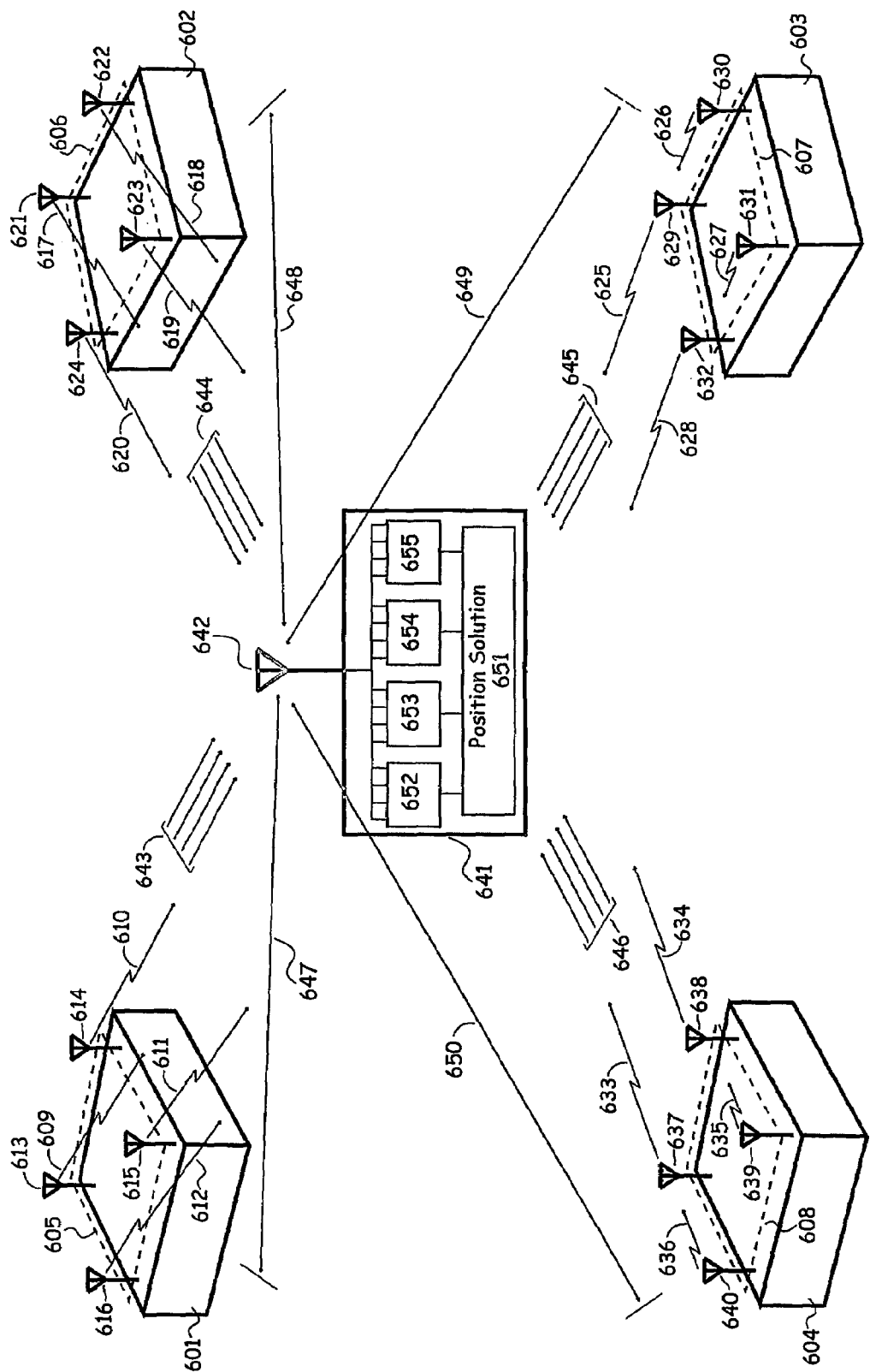
FIG. 6 is a graphical representation of an observing receiver configuration according to the present invention, whereby a network of four chronologically synchronized Positioning-Unit Devices which each incorporate a spatially diverse transmit cluster, is broadcasting sixteen unique positioning signals through sixteen spatially distributed antenna elements to an observing receiver. The observing receiver is configured to preprocess all sixteen unique positioning signals, before passing the preprocessed positioning signals to a position solution algorithm.

Referring now to FIG. 6, there is depicted a network of four chronologically synchronized Positioning-Unit Devices 601, 602, 603, & 604, each configured with a spatially distributed transmit cluster 605, 606, 607, & 608 transmitting on identical carrier frequencies. The first transmit cluster 605 transmits four synchronous unique pseudorandom number (PRN) codes 609, 610, 611, & 612 via four spatially distributed antenna elements 613, 614, 615 & 616. The second transmit cluster 606 transmits four synchronous unique pseudorandom number (PRN) codes 617, 618, 619, & 620 via four spatially distributed antenna elements 621, 622, 623 & 624. The third transmit cluster 607 transmits four synchronous unique pseudorandom number (PRN) codes 625, 626, 627, & 628 via four spatially distributed antenna elements 629, 630, 631 & 632. The forth transmit cluster 608 transmits four synchronous unique pseudorandom number (PRN) codes 633, 634, 635, & 636 via four spatially distributed antenna elements 637, 638, 639 & 640. All spatially distributed antenna elements 613, 614, 615, 616, 621, 622, 623, 624, 629, 630, 631, 632, 637, 638, 639 & 640 are positioned at known locations, with each element transmitting a unique positioning signal on the same carrier frequency. There is also depicted an observing receiver 641, which receives the sixteen synchronous unique pseudorandom number (PRN) codes 609, 610, 611, 612, 617, 618, 619, 620, 625, 626, 627, 628, 633, 634, 635, & 636 from the four spatially distributed transmit clusters 605, 606, 607. & 608 via a receive antenna 642. The unit vectors 643, 644, 645, & 646 and the geometric ranges 647, 648, 649, & 650 of the four synchronous unique pseudorandom number (PRN) codes generated from each transmit cluster, 605, 606, 607, & 608, are substantially equal within each transmit cluster 605, 606, 607, & 608 relative to the receive antenna 642.

The observing receiver 641 requires sufficient Positioning-Unit Devices to be in view to determine a position solution. Preferably, the observing receiver 641 utilizes at least three Positioning-Unit Devices to determine a two-dimensional position solution, or at least four Positioning-Unit Devices to determine a three-dimensional position solution. However, position solutions determined by the observing receiver 641 utilizing less than three Positioning-Unit Devices remains within the broad scope and ambit of the present invention. The observing receiver 641 is configured to pass unique positioning signals 609, 610, 611, 612 to a first preprocess algorithm means 652, unique positioning signals 617, 618, 619, & 620 to a second preprocess algorithm means 653, unique positioning signals 625, 626, 627, & 628 to a third preprocess algorithm means 654, and unique positioning signals 633, 634, 635, & 636 to a forth preprocess algorithm means 655. The preprocess algorithm means 652, 653, 654, & 655 processes the received clustered positioning signals utilizing either (a) an averaging algorithm to produce the mean pseudorange of each cluster, (b) a range estimator algorithm to produce a best fit pseudorange estimate from each cluster, or (c) a coherence determination algorithm to select substantially coherent pseudoranges from each cluster, or (d) any combination of the above described algorithms. The preprocessed positioning signals are subsequently passed to the observing receiver positioning algorithm means 651, so as to determine either (a) an over-determined position solution, or (b) a RAIM dependant position solution, (c) a position solution filtered by a position estimator algorithm, such as a Kalman filter, or (d) any combination of these solutions.

Figure 7:
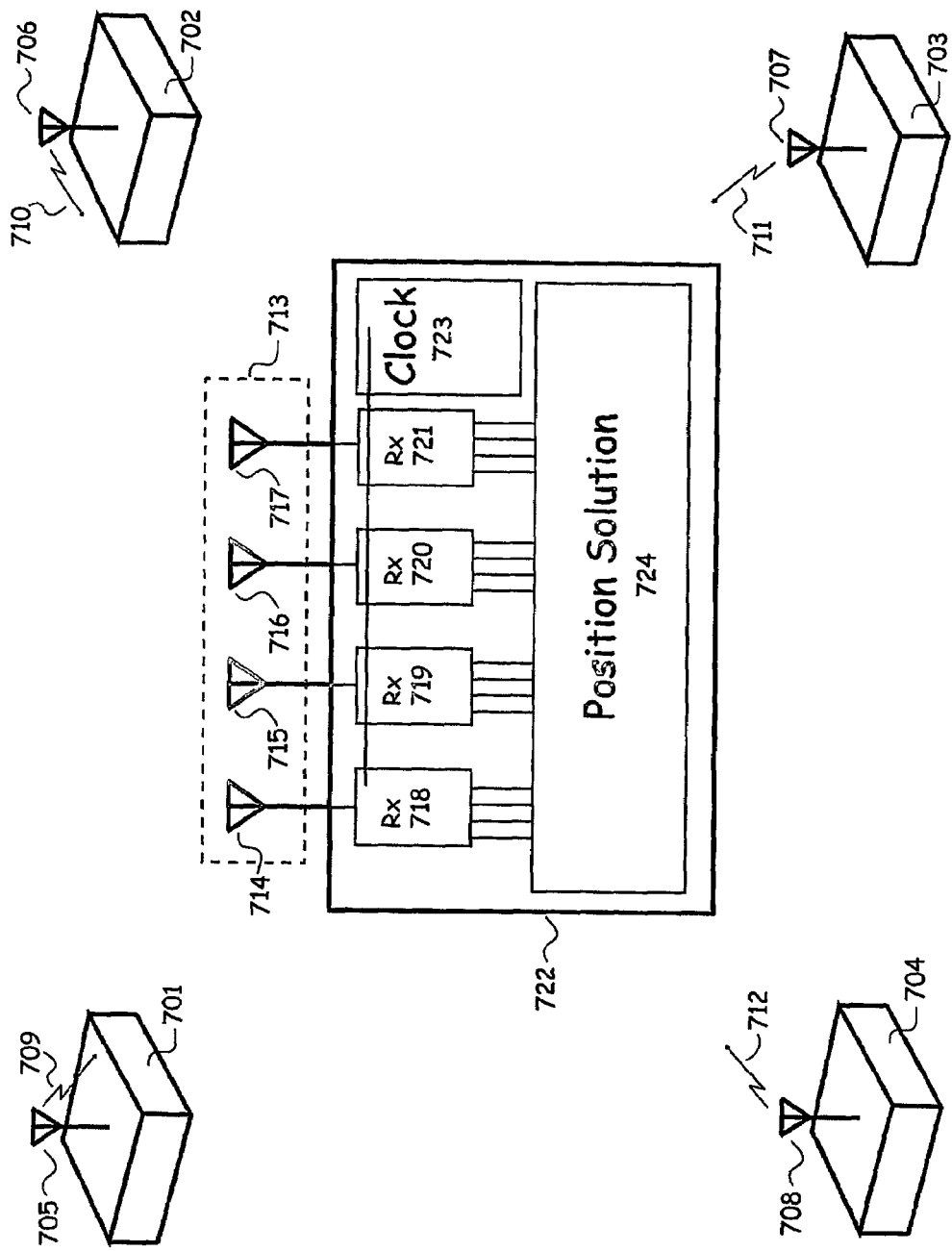
FIG. 7 is a graphical representation of an observing receiver configuration according to the present invention, whereby an observing receiver, which incorporates a spatially diverse receive cluster, is receiving sixteen discrete positioning signals from four Positioning-Unit Devices through four spatially distributed receive antenna elements. The observing receiver is configured to pass all sixteen discrete positioning signals to a position solution algorithm.

Referring now to FIG. 7, there are depicted four Positioning-Unit Devices 701, 702, 703, & 704, each configured with a single transmit antenna element 705, 706, 707, & 708 positioned at known locations and each configured to transmit a unique synchronous positioning signal 709, 710, 711, & 712. Also depicted is a spatially diverse receive cluster 713, which incorporates four spatially distributed receive antenna elements 714, 715, 716, & 717. Each receive antenna element 714, 715, 716, & 717 is connected to a discrete receiver path 718, 719, 720, & 721 within an observing receiver 722. Each receiver path 718, 719, 720, & 721 is synchronized from a common receiver clock 723. The discrete receive antenna elements 714, 715, 716, & 717 which are connected to discrete receiver paths 718, 719, 720, & 721 create four discrete pseudorange, Integrated Carrier Phase (ICP), Doppler, and signal strength measurements for each received unique positioning signal 709, 710, 711, & 712, and thus create sixteen discrete positioning signals for the four Positioning-Unit Devices in-view 701, 702, 703, & 704.

The observing receiver 722 requires sufficient Positioning-Unit Devices to be in view to determine a position solution. Preferably, the observing receiver 722 utilizes at least three Positioning-Unit Devices to determine a two-dimensional position solution, or at least four Positioning-Unit Devices to determine a three-dimensional position solution. However, position solutions determined by the observing receiver 722 utilizing less than three Positioning-Unit Devices remains within the broad scope and ambit of the present invention. The observing receiver 722 is configured to pass all unique positioning signals 709, 710, 711, 712 to the observing receiver positioning algorithm means 724, so as to determine either (a) an over-determined position solution, (b) a RAIM dependant position solution, (c) a position solution filtered by a position estimator algorithm, such as a Kalman filter, or (d) any combination of these solutions.

Figure 8:
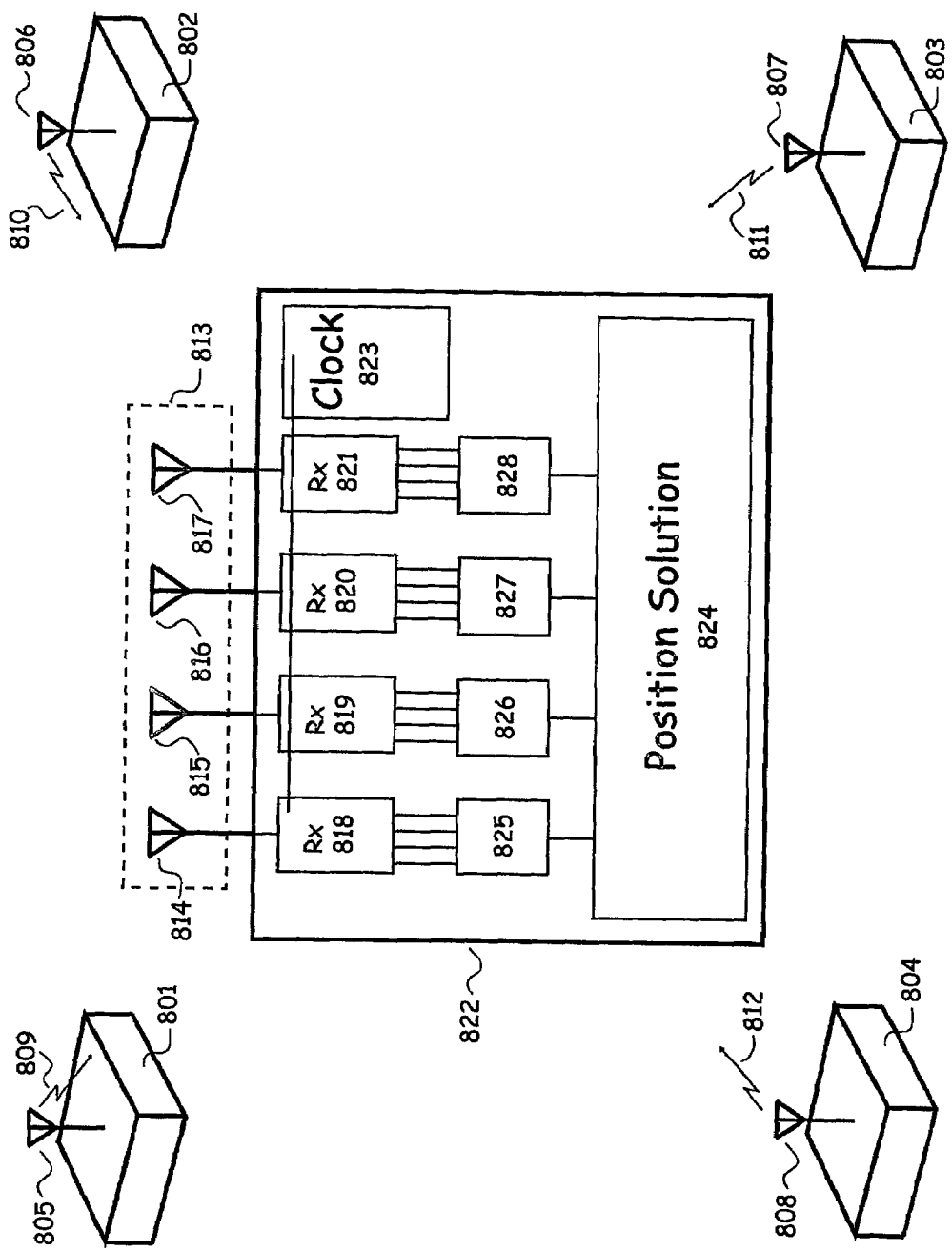
FIG. 8 is a graphical representation of an observing receiver configuration according to the present invention, whereby an observing receiver, which incorporates a spatially diverse receive cluster, is receiving sixteen discrete positioning signals from four Positioning-Unit Devices through four spatially distributed receive antenna elements. The observing receiver is configured to preprocess all sixteen discrete positioning signals, before passing the preprocessed positioning signals to a position solution algorithm.

Referring now to FIG. 8, there are depicted four Positioning-Unit Devices 801, 802, 803, & 804, each configured with a single transmit antenna element 805, 806, 807, & 808 positioned at known locations and each configured to transmit a unique synchronous positioning signal 809, 810, 811, & 812. Also depicted is a spatially diverse receive cluster 813, which incorporates four spatially distributed receive antenna elements 814, 815, 816, & 817. Each receive antenna element 814, 815, 816, & 817 is connected to a discrete receiver path 818, 819, 820, & 821 within an observing receiver 822. Each receiver path 818, 819, 820, & 821 is synchronized from a common receiver clock 823. The discrete receive antenna elements 814, 815, 816, & 817 which are connected to discrete receiver paths 818, 819, 820, & 821 create four discrete pseudorange, Integrated Carrier Phase (ICP), Doppler, and signal strength measurements for each received unique positioning signal 809, 810, 811, & 812, and thus create sixteen discrete positioning signals for the four Positioning-Unit Devices in-view 801, 802, 803, & 804.

The observing receiver 822 requires sufficient Positioning-Unit Devices to be in view to determine a position solution. Preferably, the observing receiver 822 utilizes at least three Positioning-Unit Devices to determine a two-dimensional position solution, or at least four Positioning-Unit Devices to determine a three-dimensional position solution. However, position solutions determined by the observing receiver 822 utilizing less than three Positioning-Unit Devices remains within the broad scope and ambit of the present invention. The observing receiver 822 is configured to pass unique positioning signals 809, 810, 811, & 812 from first receive antenna element 814 to a first preprocess algorithm means 825, unique positioning signals 809, 810, 811, & 812 from second receive antenna element 815 to a second preprocess algorithm means 826, unique positioning signals 809, 810, 811, & 812 from third receive antenna element 816 to a third preprocess algorithm means 827, and unique positioning signals 809, 810, 811, & 812 from fourth receive antenna element 817 to a fourth preprocess algorithm means 828. The preprocess algorithm means 825, 826, 827, & 828 processes the received clustered positioning signals utilizing either (a) an averaging algorithm to produce the mean range of each cluster, (b) a range estimator algorithm to produce a best fit range estimate from each cluster, or (c) a coherence determination algorithm to select substantially coherent ranges from each cluster, or (d) a combination of the above described algorithms. The preprocessed positioning signals are subsequently passed to the observing receiver positioning algorithm means 824, so to determine either (a) an over-determined position solution, or (b) a RAIM dependant position solution, (c) a position solution filtered by a position estimator algorithm, such as a Kalman filter, or (d) any combination of these solutions.

Whilst FIGS. 1-8, for clarity, show illustrative examples using a defined number of positioning signals and antenna elements within a cluster, there is no inherent limitation to the possible number of positioning signals or antenna elements in a cluster. The greater the number of positioning signals transmitted or received from a cluster, the better the integrity of the range measurement obtained. Furthermore, because of the large number of positioning signals transmitted or received by a cluster system, a receiver does not need to receive every transmitted signal to operate in accordance with the present invention. This inherent level of redundancy is not available from prior art positioning systems.

Positioning Signal Measurements

Within the scope of the present invention, particular attention is given to the pseudorange, Integrated Carrier Phase (ICP), Doppler and signal strength measurements of the positioning signals. However, any other positioning information that can be obtained from the positioning signals, and used to infer positioning signal integrity, falls within the broad scope and ambit of the present invention. For example, the measurement of In-Phase and Quadrature (I & Q) measurements of the observing receiver carrier tracking loops, or early and late correlator tracking arm measurements of the observing receiver pseudorandom number (PRN) code delay lock loops (DLLs) may be used as further indicators of positioning signal integrity, and therefore fall within the broad scope of the present invention.

Pseudorange measurements are created by the correlation of received pseudorandom number (PRN) codes with internally generated pseudorandom number (PRN) codes from an observing receiver. This process is inherently noisy and heavily affected by multipath. Traditional methods to improve these inherently noisy measurements involve increasing the chipping rate of the pseudorandom number (PRN) codes to decrease pseudorange noise, which concurrently increases multipath mitigation. However, increased chipping rates increase RF bandwidth, receiver power consumption and receiver complexity. The present invention discloses a system and method whereby a plurality of diverse unique and/or discrete positioning signals, which exhibit substantially equal unit vectors and geometric ranges, are interpreted in a parallel fashion to decrease instantaneous pseudorange noise and mitigate multipath, without the constraints imposed by faster chipping rates.

Doppler, in the context of the present invention, is the measurement of relative motion between a Positioning-Unit Device and an observing receiver. Doppler is measured using the observing receiver carrier tracking loop digitally controlled oscillator (DCO) values of each tracking channel. The carrier tracking loop digitally controlled oscillators (DCOs) track and measure the velocity of the observing receiver relative to each Positioning-Unit Device by referencing against the observing receiver local clock. This means the digitally controlled oscillators (DCOs) also track a common-mode receiver clock drift. All Doppler measurements from a cluster will be substantially equal in a multipath-free environment, irrespective of any user movement or common-mode receiver clock drift. In multipath environments the carrier tracking loop digitally controlled oscillators (DCOs) are easily destabilized due to the large fluctuations in phase and signal power caused by reflected signals combining in a destructive manner. Armed with the knowledge that all digitally controlled oscillator (DCO) values from a cluster will be substantially equal in a multipath-free environment, it is possible to accurately estimate the correct digitally controlled oscillator (DCO) value in multipath conditions. This is achieved by comparing all instantaneously sampled digitally controlled oscillator (DCO) values from a cluster and determining a substantially coherent and/or best-fit digitally controlled oscillator (DCO) value at each measurement epoch.

Integrated Carrier Phase (ICP) is derived by accumulating Doppler measurements, which is used in observing receivers to determine an accurate change-in-range measurement. Therefore, substantially coherent and/or best-fit carrier tracking loop digitally controlled oscillator (DCO) values provide significant benefit in determining an accurate Integrated Carrier Phase (ICP) measurement.

Signal strength measurements determine the ability of an observing receiver to track received positioning signals. If the received signal strength drops below a prescribed value, tracking of the positioning signal by the observing receiver will become marginal and may cease altogether. This can occur when the observing receiver has moved a significant distance away from transmission source, or it can also occur when destructive multipath reflections cause degraded signal strengths. An observing receiver, which only has access to one signal from a transmission source, has no way of determining if it has exceeded the range of the transmission source or if it is in a multipath fade. In multipath-free environments received signal strengths from a cluster will be substantially equal, as the distance between each antenna element within a cluster is relatively small in comparison with the distance between the transmission source and the observing receiver. However, in multipath conditions the signal strengths will vary widely. Armed with the knowledge that all signal strength values from a cluster will be substantially equal in a multipath-free environment, it is possible to accurately estimate the correct signal strength value in multipath conditions by comparing all signal strength values from a cluster and determining a substantially coherent and/or best-fit signal strength value. Furthermore, positioning signals that are measured below the substantially coherent and/or best-fit signal strength value can be deemed multipath affected and as such eliminated from the range estimate.

Combinations of positioning signal measurements may also used to evaluate positioning signal coherence. For example, substantially coherent digitally controlled oscillator (DCO) values from a cluster may be compared with substantially coherent signal strengths from the cluster to improve coherency integrity.

Substantially Coherent Positioning Signals

Substantially coherent positioning signals are defined as positioning signals that when received and interpreted by an observing receiver produce measurements that are substantially similar. Examples of measurements produced in an observing receiver include, but are not limited to, pseudorange, Integrated Carrier Phase (ICP), Doppler, signal strength, and in-phase and quadrature (I&Q) tracking loop values. Qualification of measurements as substantially similar is preferably established through a mathematical procedure such as: 1) differencing measurements and comparing the differences to a threshold or tolerance, 2) spectral analysis, 3) convolution, 4) correlation, 5) Fourier transformation analysis, or any other technique capable of observing coherence that would be known to someone skilled in the art of mathematical coherence. Specific coherence qualification values are determined by design decisions associated with each specific embodiment of the invention. For illustrative example only, tolerance values may be configured such that measured pseudoranges within 1 metre of one another are deemed code-coherent, Integrated Carrier Phase (ICP) measurements that are within 0.1 carrier cycle of one another are deemed carrier-coherent, carrier tracking loop digital controlled oscillator (DCO) values that are within 0.1 Hertz of one another are deemed Doppler-coherent, and received signal strengths that are within 1 dB of one another are deemed signal strength-coherent. The assignment of tolerance values is dependent upon system configuration and user requirements, and as such may be individually set in each observing receiver. For example, system configuration will dictate the number of positioning signals available from each transmit cluster, and therefore how many observables an observing receiver preprocess and/or positioning algorithm has access to. The more observables, the better the integrity of coherence, and therefore the closer the assigned tolerance values may be set. User requirements also differ. Some users may choose to trade-off cluster coherency (i.e. system accuracy in multipath conditions) for system availability, whereas other users may choose increased cluster coherency to ensure increased system integrity.

Diversity

Diverse radio links can be created at either the transmitter or receiver, or at both the transmitter and the receiver simultaneously. Transmit diversity is preferably achieved using spatial, frequency, or polarization means (as described below), although other forms of diversity can be used and remain within the broad scope and ambit of the present invention.

a) Transmit spatial diversity requires a plurality of antenna elements to be placed closely together (preferably one-half carrier wavelength or less), with each element situated at a known location and transmitting a unique synchronous positioning signal.

b) Transmit frequency diversity requires the transmission of a plurality of frequencies through an antenna element placed at a known location, with each frequency transmitting a synchronous unique positioning signal.

c) Transmit polarization diversity requires a plurality of uniquely polarized antenna elements to be placed closely together (preferably less than one-half of the carrier cycle carrier wavelength), with each element situated at a known location and transmitting a unique synchronous positioning signal.

Spatial, frequency, or polarization diversity may be combined to generate even greater diversity. For example, a cluster of spatially distributed antenna elements with unique polarization characteristics may each transmit a plurality of unique positioning signals on a plurality of carrier frequencies.

Receive diversity is also preferably achieved using spatial, frequency, or polarization means, although other forms of diversity can be used and remain within the broad ambit of the invention.

a) Receive spatial diversity requires a plurality of antenna elements to be placed closely together (preferably one-half of the carrier wavelength), with each element individually receiving and tracking the same transmitted unique positioning signal.

b) Receive frequency diversity requires the individual reception of a plurality of synchronous unique positioning signals which have been transmitted on a plurality of frequencies.

c) Receive polarization diversity requires a plurality of uniquely polarized antenna elements to be placed closely together (preferably less than one-half the carrier wavelength), with each element individually receiving and tracking the same unique positioning signal.

Receive spatial, frequency, or polarization diversity may be combined to generate even greater diversity. For example, a receive cluster of spatially distributed antenna elements with unique polarization characteristics may each receive a plurality of unique positioning signals on a plurality of carrier frequencies.

The present invention may further embody any combination of the above described diverse radio link methods for increased diversity. These methods include both single frequency diversity combinations and multiple frequency diversity combinations. With single frequency diversity combinations, the observing receiver interprets a plurality of unique positioning signals transmitted on identical carrier frequencies. Transmission of positioning signals on a single carrier frequency has the advantage of not suffering from varying group delay, as experienced by multiple frequency systems. Single frequency diversity combinations include, but are not limited to:

a) A spatially diverse transmit cluster which transmits a plurality of unique positioning signals to a spatially diverse receiver cluster.

b) A spatially diverse transmit cluster which transmits a plurality of unique positioning signals to a polarization diverse receiver cluster.

c) A polarization diverse transmit cluster which transmits a plurality of unique positioning signals to a polarization diverse receiver cluster.

d) A polarization diverse transmit cluster which transmits a plurality of unique positioning signals to a spatially diverse receiver cluster.

Furthermore, the present invention allows for multiple frequency diversity combinations transmitting to single antenna observing receivers which include, but are not limited to:

a) A spatially diverse transmit cluster combined with a frequency diverse transmit cluster which transmits a plurality of unique positioning signals to a single antenna on a multi-frequency observing receiver.
b) A polarization diverse transmit cluster combined with a frequency diverse transmit cluster which transmits a plurality of unique positioning signals to a single antenna on a multi-frequency observing receiver.
c) A spatially diverse transmit cluster combined with a polarization diverse transmit cluster which transmits a plurality of unique positioning signals to a single frequency observing receiver.
d) A spatially diverse transmit cluster, combined with a frequency diverse transmit cluster, combined with a polarization diverse transmit cluster, which transmits a plurality of unique positioning signals to a single antenna on a multi-frequency observing receiver.

Multipath Severity Indicator

The level of non-coherence of positioning signals measured from a cluster can also be used as a Multipath Severity Indicator (MSI). Low cluster coherence indicates heavy multipath conditions, and high cluster coherence indicates low multipath conditions. In situations where redundant Positioning-Unit Device signals are available, an observing receiver may use the calculated Multipath Severity Indicator (MSI) to determine multipath severity from each Positioning-Unit Device, and then select the least multipath corrupted set of Positioning-Unit Devices to provide to the position algorithm. Furthermore, the Multipath Severity Indicator (MSI) can be used as a multipath integrity check. If all positioning signals from all clusters indicate low cluster coherence, a warning can be provided to the user indicating an estimated degradation of position accuracy.

Cycle Slip Detection and Repair

The process of selecting substantially coherent and/or best-fit positioning signals from a cluster, as described previously in this specification, eliminates the phenomenon of cycle slip. However, for completeness it should be noted that receiver systems that do not incorporate the foregoing receiver methodologies can use the non-coherence of positioning signals from a cluster to provide a robust carrier cycle slip detection and repair method. Cycle slips are detected by comparing positioning signals from a cluster and identifying non-coherent a) half or whole cycle step functions in the Integrated Carrier Phase (ICP) measurements, and/or
b) 'spikes' in the carrier DCO values, and/or
c) 'spikes' in the pseudorange measurements, and/or
d) abrupt signal strength fades, and/or
e) abrupt changes in the carrier tracking loop I & Q values.

When a cycle slip is detected the Integrated Carrier Phase (ICP) measurement of the offending channel is corrected by the requisite number of half or whole cycles to bring it back into agreement with the Integrated Carrier Phase (ICP) measurements of the substantially coherent positioning signals within the cluster.

It will of course be realized that whilst the above has been given by way of an illustrative example of this invention, all such and other modifications and variations hereto, as would be apparent to persons skilled in the art, are deemed to fall within the broad scope and ambit of this invention as is herein set forth.

What is claimed is:

1. A method for mitigating multipath in a positioning system range measurement, the method comprising:
a) transmitting a plurality of synchronous unique positioning signals from a plurality of antenna elements in known locations;
b) receiving said plurality of synchronous unique positioning signals at an observing receiver;
c) determining which of said plurality of synchronous unique positioning signals received in step b) exhibit substantially equal geometric ranges and unit vectors with respect to said observing receiver;
d) interpreting signals determined in step c) to calculate optimal said range measurement.

2. The method of claim 1, wherein said interpreting signals in step d) includes the selection of substantially coherent said plurality of synchronous unique positioning signals.

3. The method of claim 1, wherein said interpreting signals in step d) includes the determination of a best-fit estimate of said plurality of synchronous unique positioning signals.

4. The method of claim 1 wherein said interpreting signals in step d) includes the determination of the mean range measurement of said plurality of synchronous unique positioning signals.

5. The method of claim 1, wherein said interpreting signals in step d) includes two or more techniques selected from the group consisting of:
(i) the selection of substantially coherent said plurality of synchronous unique positioning signals,
(ii) the determination of a best-fit estimate of said plurality of synchronous unique positioning signals, and
(iii) the determination of the mean range measurement of said plurality of synchronous unique positioning signals.

6. A system for mitigating multipath in a positioning system range measurement, the system comprising:
a) means for transmitting a plurality of synchronous unique positioning signals from a plurality of antenna elements in known locations;
b) means for receiving said plurality of synchronous unique positioning signals at an observing receiver;
c) means for determining which of said plurality of synchronous unique positioning signals received in step b) exhibit substantially equal geometric ranges and unit vectors with respect to said observing receiver;
e) means for interpreting signals determined in step c) to calculate optimal said range measurement.

7. The system of claim 6, further incorporating means configured to select substantially coherent said plurality of synchronous unique positioning signals.

8. The system of claim 6, further incorporating means configured to determine a best-fit estimate of said plurality of synchronous unique positioning signals.

9. The system of claim 6, further incorporating means configured to determine the mean range measurement of said plurality of synchronous unique positioning signals.

10. The system of claim 6, further incorporating means configured to process, in combination, two or more techniques selected from the group consisting of:
(i) the selection of substantially coherent said plurality of synchronous unique positioning signals,
(ii) the determination of a best-fit estimate of said plurality of synchronous unique positioning signals, and
(iii) the determination of the mean range measurement of said plurality of synchronous unique positioning signals.

11. A method of mitigating multipath in an observing receiver position solution, the method comprising:

a) transmitting a plurality of synchronous unique positioning signals from a plurality of antenna elements in known locations;
b) receiving said plurality of synchronous unique positioning signals at said observing receiver;
c) determining which of said plurality of synchronous unique positioning signals received in step b) exhibit substantially equal geometric ranges and unit vectors with respect to said observing receiver;
d) interpreting signals determined in step c) to calculate optimal range measurements;
e) processing said optimal range measurements to determine said position solution.

12. The method of claim 11, wherein said interpreting signals in step d) includes the selection of substantially coherent said plurality of synchronous unique positioning signals.

13. The method of claim 11, wherein said interpreting signals in step d) includes the determination of a best-fit estimate of said plurality of synchronous unique positioning signals.

14. The method of claim 11, wherein said interpreting signals in step d) includes the determination of the mean range measurement of said plurality of synchronous unique positioning signals.

15. The method of claim 11, wherein said interpreting signals in step d) includes two or more techniques selected from the group consisting of:
  (i) the selection of substantially coherent said plurality of synchronous unique positioning signals,
  (ii) the determination of a best-fit estimate of said plurality of synchronous unique positioning signals, and
  (iii) the determination of the mean range measurement of said plurality of synchronous unique positioning signals.

16. The method of claim 11, wherein said processing in step e) includes a receiver autonomous integrity monitoring algorithm.

17. The method of claim 11, wherein said processing in step e) includes a Kalman filter or other best-fit positioning algorithm.

18. A method for mitigating multipath in a positioning system range measurement, the method comprising:
  a) transmitting a plurality of synchronous unique positioning signals from a plurality of transmit antenna elements in known locations;
  b) receiving said plurality of synchronous unique positioning signals at an observing receiver via a plurality of receive antenna elements which exhibit substantially equal geometric ranges and unit vectors with respect to said plurality of transmit antenna elements;
  c) interpreting signals received in step b) to calculate optimal said range measurement.

19. The method of claim 18, wherein said interpreting signals in step c) includes the selection of substantially coherent said plurality of synchronous unique positioning signals.

20. The method of claim 18, wherein said interpreting signals in step c) includes the determination of a best-fit estimate of said plurality of synchronous unique positioning signals.

21. The method of claim 18, wherein said interpreting signals in step c) includes the determination of the mean range measurement of said plurality of synchronous unique positioning signals.

22. The method of claim 18, wherein said interpreting signals in step c) includes two or more techniques selected from the group consisting of:
  (i) the selection of substantially coherent said plurality of synchronous unique positioning signals,
  (ii) the determination of a best-fit estimate of said plurality of synchronous unique positioning signals, and
  (iii) the determination of the mean range measurement of said plurality of synchronous unique positioning signals.

23. A method of mitigating multipath in an observing receiver position solution, the method comprising:
  a) transmitting a plurality of synchronous unique positioning signals from a plurality of transmit antenna elements in known locations;
  b) receiving said plurality of synchronous unique positioning signals at an observing receiver via a plurality of receive antenna elements which exhibit substantially equal geometric ranges and unit vectors with respect to said plurality of transmit antenna elements;
  c) interpreting signals received in step b) to calculate optimal said range measurement,
  d) processing said optimal range measurements to determine said position solution.

24. The method of claim 23, wherein said interpreting signals in step c) includes the selection of substantially coherent said plurality of synchronous unique positioning signals.

25. The method of claim 23, wherein said interpreting signals in step c) includes the determination of a best-fit estimate of said plurality of synchronous unique positioning signals.

26. The method of claim 23, wherein said interpreting signals in step c) includes the determination of the mean range measurement of said plurality of synchronous unique positioning signals.

27. The method of claim 23, wherein said interpreting signals in step c) includes two or more techniques selected from the group consisting of:
  (i) the selection of substantially coherent said plurality of synchronous unique positioning signals,
  (ii) the determination of a best-fit estimate of said plurality of synchronous unique positioning signals, and
  (iii) the determination of the mean range measurement of said plurality of synchronous unique positioning signals.

28. The method of claim 23, wherein said processing in step d) includes a receiver autonomous integrity monitoring algorithm.

29. The method of claim 23, wherein said processing in step d) includes a Kalman filter or other best-fit positioning algorithm.

* * * * *